US007652542B2

(12) United States Patent
Matsuno

(10) Patent No.: US 7,652,542 B2
(45) Date of Patent: Jan. 26, 2010

(54) SIGNAL GENERATOR, AND TRANSMITTER, RECEIVER AND TRANSCEIVER USING SAME

(75) Inventor: Noriaki Matsuno, Minato-ku (JP)

(73) Assignee: NEC Corporation, Tokyo (JP)

( * ) Notice: Subject to any disclaimer, the term of this patent is extended or adjusted under 35 U.S.C. 154(b) by 614 days.

(21) Appl. No.: 11/569,049

(22) PCT Filed: Apr. 19, 2005

(86) PCT No.: PCT/JP2005/007427

§ 371 (c)(1),
(2), (4) Date: Nov. 13, 2006

(87) PCT Pub. No.: WO2005/112292

PCT Pub. Date: Nov. 24, 2005

(65) Prior Publication Data

US 2008/0003954 A1    Jan. 3, 2008

(30) Foreign Application Priority Data

May 17, 2004    (JP)    ............................. 2004-145955

(51) Int. Cl.
*H03B 21/00* (2006.01)
*H03B 21/01* (2006.01)
(52) U.S. Cl. .............................. 331/37; 331/41; 331/49; 331/74
(58) Field of Classification Search .................... 331/25, 331/37–41, 46, 49, 74–76
See application file for complete search history.

(56) References Cited

U.S. PATENT DOCUMENTS 4,914,405 A * 4/1990 Wells ........................... 331/25

FOREIGN PATENT DOCUMENTS

| JP | 1-222526 A | 9/1989 |
| JP | 6-45930 A | 2/1994 |
| JP | 8-8742 A | 1/1996 |
| JP | 10-209922 A | 8/1998 |
| JP | 2001-136055 A | 5/2001 |
| JP | 2001-237700 A | 8/2001 |
| JP | 2002-164784 A | 6/2002 |
| JP | 2003-243983 A | 8/2003 |
| JP | 2004-153547 A | 5/2004 |
| JP | 2004-356927 A | 12/2004 |
| JP | 2005-129993 A | 5/2005 |

* cited by examiner

*Primary Examiner*—David Mis
(74) *Attorney, Agent, or Firm*—Sughrue Mion, PLLC

(57) ABSTRACT

A signal generator generates a first internal signal including frequency f1, a second internal signal including frequency f2, and a third internal signal including frequency f3 twice as high as frequency f2, and selects and delivers one from among a first output signal including frequency f1, a second output signal including frequency f1+f2, and a third output signal including frequency f1+f3, using the first, second, and third internal signals.

72 Claims, 14 Drawing Sheets

SIGNAL GENERATOR, AND TRANSMITTER, RECEIVER AND TRANSCEIVER USING SAME

This application claims priority from PCT Application No. PCT/JP2005/007427 filed Apr. 19, 2005, and from Japanese Patent Application No. 2004-145955, filed May 17, 2004, which applications are incorporated herein by reference.

TECHNICAL FIELD

The present invention relates to a signal generator, and a transmitter, a receiver and a transceiver using the same, and more particularly, to a signal generator suitable for use in a transceiver which employs fast frequency hopping or the like, and a transmitter, a receiver and a transceiver using the same.

BACKGROUND ART

FIGS. 1 and 2 are diagrams for describing a radio communications scheme using UWB (Ultra Wide Band) technology, and are extracted from a document numbered IEEE802.15-03-267r5 which has been submitted to the IEEE802 Committee.

As illustrated in FIG. 1, in a multi-band OFDM (Orthogonal Frequency Divisional Multiplexing) scheme which is one type of UWB proposed in the document, a frequency band from 3.1 to 10.6 GHz freed as a UWB consumer available band is divided into 14 sub-bands, some of which are used in combination. A mode-1 device, which is one of them, utilizes three sub-bands Band#1-Band#3 on the lower frequency side shown in FIG. 2. Specifically, the mode-1 device transmits OFDM symbols while switching the three sub-bands every 312.5 ns, i.e., while hopping the frequency. Upon the frequency hopping, the frequency is switched in 9.5 ns.

A transceiver which employs such fast frequency hopping requires a local signal generator which is capable of switching from one frequency to another at high speeds. Frequency hopping within 9.5 ns cannot be carried out by a system which utilizes a PLL frequency synthesizer capable of fast frequency locking, which is used in a conventional frequency hopping system. The reason for this is attributable to the inability to realize a voltage controlled oscillator which can vary the frequency over such a wide band, and has phase-noise characteristics which endure radio communication applications. Also, for completing frequency switching within 9.5 ns, a plurality of phase comparison operations are required in the period of 9.5 ns, so that the phase comparison frequency is at least on the order of GHz, thus experiencing difficulty in fully satisfying phase-noise characteristics, power consumption, and cost required for mobile radio communications.

FIG. 3 is a diagram illustrating a conventional local signal generator which supports fast hopping.

As illustrated in FIG. 3, this related art example comprises an oscillation source comprised of voltage controlled oscillator 81 and PLL 82 for generating a frequency of 4224 MHz, which is divided by 1/8 frequency divider 83 to generate a signal at 528 MHz, which is again divided by 1/2 frequency divider 84 to generate a signal at 264 MHz. Then, the signal at 264 MHz and signal at 528 MHz are applied to single side-band mixer (SSB mixer, SSB) 85 to generate a signal at 729 MHz which is the sum of the two frequencies. One signal is selected by selector 86 from among the signals at 264 MHz and the signal at 792 MHz, and supplied to another single side-band mixer 87. This second single side-band mixer 87 generates a signal at 4488 MHz which is the sum of the frequencies 4224 MHz and 264 MHz; a signal at 3960 MHz which is the difference between 4224 MHz and 264 MHz; and a signal at 3432 MHz which is the difference between 4224 MHz and 792 MHz, respectively.

In this connection, the single band mixer switches a differential frequency and a sum frequency for delivery in the following manner. First, sin and cos are provided for a component at frequency f1 and a component at frequency f2, respectively. Exemplary signal processing for generating the sum frequency may involve the following method:

$\sin(2\times\pi\times f1\times t)\times\cos(2\times\pi\times f2\times t)+\cos(2\times\pi\times f1\times t)\times\sin(2\times\pi\times f2\times t)=\sin\{2\times\pi\times(f1+f2)\times t\}$ On the other hand, the differential frequency may be calculated in the following manner:

$\sin(2\times\pi\times f1\times t)\times\cos(2\times\pi\times f2\times t)-\cos(2\times\pi\times f1\times t)\times\sin(2\times\pi\times f2\times t)=\sin\{2\times\pi\times(f1-f2)\times t\}$ When all circuits comprise differential circuits, the sum frequency and differential frequency can be selectively provided, for example, by allowing switching between a negative and a positive sign for $\sin(2\times\pi\times f2\times t)$ through the switching unit.

The related art example illustrated in FIG. 3, however, has problems as listed below.

Even while generating the sum frequency of 4224 MHz and 264 MHz, a differential frequency component therebetween, which is an undesired wave, is in actuality parasitically generated. Its magnitude depends on the image rejection ratio of the single side-band mixer. Taking into account variations associated with device fabrication and the like, the image rejection ratio generally takes a value of 30 dB more or less. Since the differential frequency corresponds to the carrier of Band#2 in FIG. 2, this differential frequency modulated with a base band signal is radiated as is from an antenna, when assuming a transmission system. Therefore, the rejection ratio of 30 dB cannot be said to be practically sufficient in some cases, so that a larger rejection is required as the case may be.

Likewise, even while generating the differential frequency between 4224 MHz and 264 MHz, a sum frequency component thereof, which is an undesired wave, is in actuality parasitically generated. This exerts the same influence as the aforementioned scenario in which the sum frequency is a desired wave and the differential frequency is an undesired wave, and a larger rejection is required as the case may be.

Also, when 264 MHz is generated by a frequency divider, the resulting waveform is generally rectangular. Therefore, a signal at 264 MHz includes 792 MHz which is a third harmonic thereof. In the course of generation of the sum frequency of 4224 MHz and 264 MHz or the differential frequency therebetween, a differential frequency between 4224 MHz and 792 MHz, caused by the third harmonic, is parasitically generated as well. Since this undesired wave component corresponds to the carrier of Band#1 in FIG. 2, this differential frequency modulated with a base band signal is radiated as it is from an antenna, when assuming a transmission system. In regard to the magnitude, the magnitude at 792 MHz is lower than the magnitude at 264 MHz by 9.4 dB, supposing that it is a completely rectangular wave. Consequently, the magnitude of the differential frequency between 4224 MHz and 792 MHz is lower by 9.4 dB with respect to the desired wave. This rejection ratio of 9.4 dB is not at all sufficient.

When single side-band mixer 85 mixes 264 MHz with 528 MHz, a generated 792 MHz component can vary in amplitude due to subtle fluctuations in frequency of the input signals, due to the fact that the third harmonic of 264 MHz and output wave are at the same frequency. This is because variations in amplitude are reflected as they are to variations in amplitude of a local signal, thus giving rise to inconveniences.

The single side-band mixer is a device which has a large chip area and consumes a large amount of power. The provision of two such devices directly results in an increase in chip area and an increase in current consumption.

As described above, the conventional PLL frequency synthesizer technology encounters difficulties in providing a local signal generator which is capable of switching frequencies at high speeds while satisfying the phase-noise characteristics, power consumption, and cost required for mobile radio communications.

Also, the related art example illustrated in FIG. 3 has a problem that a variety of undesired waves are generated, and the undesired waves modulated with a base band signal are radiated as they are from an antenna. Otherwise, another problem arises in which a local signal varies in amplitude.

DISCLOSURE OF THE INVENTION

It is an object of the present invention to provide a signal generator which supports fast frequency switching.

To achieve the above object, the present invention has:

internal signal generating means for generating a first internal signal with a frequency of f1, a second internal signal with a frequency of f2, and a third internal signal with a frequency of f3 which is twice as high as frequency f2; and signal output means for selecting and delivering one of a first output signal with the frequency of f1, a second output signal with a frequency of f1+f2, and a third output signal with a frequency of f1+f3, using the first, second, and third internal signals.

Also, the present invention has:

internal signal generating means for generating a first internal signal with a frequency of f1, a second internal signal with a frequency of f2, and a third internal signal with a frequency of f3 which is twice as high as the frequency f2; and signal output means for selecting and delivering one of a first output signal with a frequency of f1, a second output signal with a frequency of f1−f2, and a third output signal with a frequency of f1−f3, using the first, second, and third internal signals.

Further, the present invention has:

internal signal generating means for generating at least a first to a third internal signal from among a first internal signal with a frequency of f1 to an n-th internal signal with a frequency of fn (n is a natural number); and signal output means for delivering one of a first output signal with a frequency of f1, a second output signal with a frequency of f1+f2, and an n-th output signal with a frequency of f1+fn, using the internal signals generated by the internal signal generating means, wherein the frequency fn is an integer multiple of frequency f2 when n is equal to or more than three.

Also, the present invention has:

internal signal generating means for generating at least a first to a third internal signal from among a first internal signals with a frequency of f1 to an n-th internal signal with a frequency of fn (n is a natural number); and signal output means for delivering one signal among of a first output signal with a frequency of f1, a second output signal with a frequency of f1−f2, and an n-th output signal with a frequency of f1−fn, using the internal signals generated by the internal signal generating means, wherein the frequency fn is an integer multiple of frequency f2 when n is equal to or more than three.

According to the present invention, a local signal generator capable of fast frequency switching can be realizing while satisfying phase-noise characteristics, power consumption, and cost requirements for mobile radio communications.

Also, according to the present invention, a signal generator can be provided to restrain the generation of various undesired waves, prevent undesired waves modulated with a base band signal from radiating as is from an antenna, or restrain the occurrence of variations in amplitude of a local signal, and support fast frequency switching.

Also, according to the present invention, the signal generator is advantageous as regards the chip area and power consumption because it requires only one single side-band mixer which occupies a large area and consumes a large current.

BEST MODE FOR CARRYING OUT THE INVENTION

Figure 4:
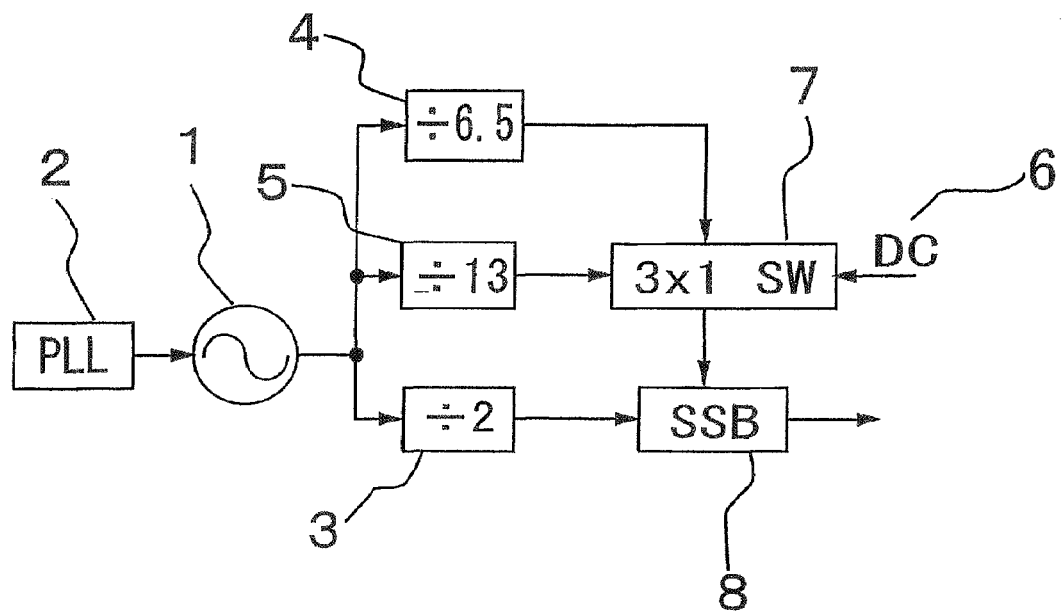
FIG. 4 is a diagram illustrating a first embodiment of a signal generator according to the present invention.

FIG. 4 is a diagram illustrating a first embodiment of a signal generator according to the present invention.

In the signal generator illustrated in FIG. 4, voltage controlled oscillator 1 is frequency locked by PLL 2, and generates a signal at a frequency of 6.864 GHz.

1/2 frequency divider 3 divides this 6.864 GHz by two to generate signals of two channels at 3.432 GHz which have a phase difference of approximately 90 degrees therebetween, and delivers its output to single side-band mixer 8. The generation of signals having a phase difference of approximately 90 degrees therebetween is readily implemented by utilizing a master side output and a slave side output of a quite commonly employed master-slave type TFF as 1/2 frequency dividers, respectively.

1/6.5 frequency divider 4 accomplishes a 1/6.5 frequency division operation by making use of both a rising edge and a falling edge of the output from voltage controlled oscillator 1, to generate signals at 1.056 GHz. Such a circuit which operates at both edges can be readily implemented by quite commonly employed prior art. Since the 1/6.5 frequency division deviates from frequency divisions by integers, its duty ratio is not maintained at 1:1 even if frequency divider 4 makes use of the operation which uses both the rising edge and falling edge of an input signal. The resulting influence will be described later. Likewise, signals at 1.056 GHz after 1/6.5 frequency division are generated to have a phase difference of approximately 90 degrees therebetween. A method may therefor employ a conventional technique which uses the aforementioned quite commonly employed master-slave type TFF. A first example contemplated here may be implemented by means for generating a first 1/6.5 frequency divided signal, and means for generating a second 1/6.5 frequency divided signal which has a delay time that is an integer multiple of a time corresponding to a half wavelength of the output of voltage controlled oscillator 1, from the first 1/6.5 frequency divided signal, in the 1/6.5 frequency divider. A second example contemplated here may be implemented by using a first 1/6.5 frequency divided signal, and a second 1/6.5 frequency divided signal produced by passing the first 1/6.5 frequency divided signal through a delay circuit.

1/13 frequency divider 5 accomplishes a 1/13 frequency division operation at a duty ratio of 1:1 by making use of both the rising edge and falling edge of the output from voltage controlled oscillator 1, and generates signals at 0.528 GHz. Such a circuit which operates at both edges can also be readily implemented by a quite commonly employed conventional technique. Likewise, signals at 0.528 GHz after 1/13 frequency division are generated to have a phase difference of approximately 90 degrees therebetween. A method may therefor employ a conventional technique which uses the aforementioned quite commonly employed master-slave type TFF. A first example contemplated here may be implemented by means for generating a first 1/13 frequency divided signal, and means for generating a second 1/13 frequency divided signal which has a delay time that is an integer multiple of a time corresponding to a half wavelength of the output of voltage controlled oscillator 1, from the first 1/13 frequency divided signal, in the 1/13 frequency divider. A second example contemplated here may be implemented by using a first 1/13 frequency divided signal, and a second 1/13 frequency divided signal produced by passing the first 1/13 frequency divided signal through a delay circuit.

These voltage controlled oscillator 1, 1/2 frequency divider 3, 1/6.5 frequency divider 4, and 1/13 frequency divider 5 make up an internal signal generating means.

Switch 7 selects one from among a component at 1.056 GHz delivered from 1/6.5 frequency divider, a component at 528 MHz delivered from 1/13 frequency divider 5, and a DC signal applied to terminal 6, and supplies the selected one to single side-band mixer 8.

Single side-band mixer 8 generates a sum frequency signal of the signal at 3.432 GHz supplied from 1/2 frequency divider 3 and a signal supplied through switch 7. Specifically, when switch 7 selects a DC signal from terminal 6, mixer 8 generates a signal at 3.423 GHz; when switch 7 selects 528 MHz, mixer 8 generates a signal at 3.960 GHz; and when switch 7 selects 1.056 GHz, the mixer generates a signal at 4.488 GHz. Since switching among these three frequencies is performed through the switching operation of switch 7, switching can be carried out in an extremely short time in the order of nanoseconds. Switch 7 and single side-band mixer 8 make up signal output means.

Figure 1:
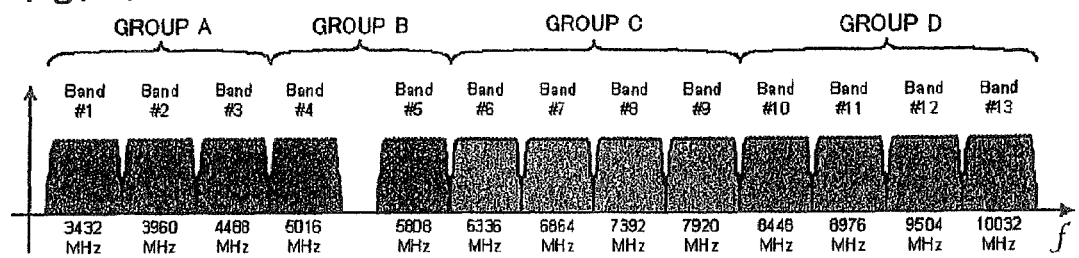
FIG. 1 is a diagram for describing a radio communications scheme which employs UWB (Ultra Wide Band) technology.
Figure 2:
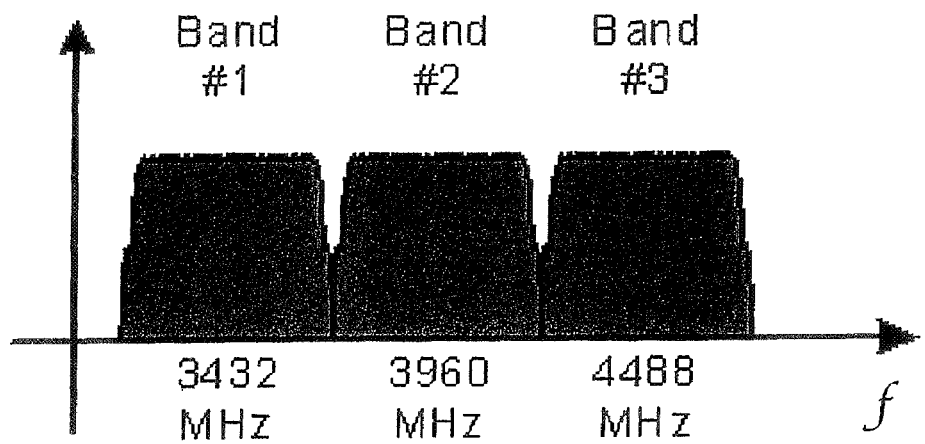
FIG. 2 is a diagram for describing a radio communications scheme which employs UWB (Ultra Wide Band) technology.

Now, consider problems suffered by the related art illustrated in FIG. 2. First, assume, as a premise, a mode-1 device which utilizes only three sub-bands on the lower frequency side shown in FIG. 2, i.e., Band#1-Band#3.

When switch 7 has selected 528 MHz, single side-band mixer 8 generates, as a desired wave, a signal at a frequency of 3.960 GHz which is the sum of the selected 528 MHz signal and 3.432 GHz signal. Simultaneously, an undesired wave at 2.904 GHz, which is a differential frequency between 548 MHz and 3.432 GHz, is generated depending on the image rejection ratio of single side-band mixer 8. However, this differential frequency lies out of the frequency range which is utilized by mode-1 devices for communications. Considering the transmission side, for example, an RF filter is typically inserted between an antenna and a chip for exclusively passing therethrough a frequency band used for communications. Therefore, when this technique is used, the image rejection ratio required for single side-band mixer 8 may be lower than the image rejection ratio when using the related art illustrated in FIG. 2.

On the other hand, when switch 7 selects 1.056 GHz, single side-band mixer 8 generates an undesired wave signal at a frequency of 2.376 GHz which is the difference between 1.056 GHz and 3.432 GHz. This also lies out of the frequency range utilized by mode-1 devices for communications, and is further away from the band utilized for communications than the aforementioned 2.904 GHz, so that no serious problem will arise.

Further, when switch 7 selects 528 MHz or 1.056 GHz, third harmonic components included therein are also supplied to single side-band mixer 8, which generates sum frequencies of these and 3.432 GHz and differential frequencies therebetween as spurious. However, the single side-band mixer exhibits the general characteristic that when a sum frequency is extracted for basic waves of two supplied signals, a differential frequency is extracted in regard to the mixing of a third harmonic of one of the input signals and the other basic wave. A sum frequency of the third harmonic and basic wave is rejected by a mechanism similar to the rejection of the differential frequency in the mixing of the basic waves with each other.

On the other hand, the differential frequency between 3.432 GHz and a third harmonic of 528 MHz is 1.848 GHz. The differential frequency between 3.432 GHz and a third harmonic of 1.057 GHz is 264 MHz. Since these components are sufficiently away from the band used for communications, they will not either cause serious problems.

The sum frequency of 3.432 GHz and a third harmonic of 528 MHz is 5.016 GHz. The sum/difference frequency of 3.432 GHz and a third harmonic of 1.056 GHz is 6.600 GHz. Since these components are sufficiently away from the band used for communications and are components which are essentially rejected by the single band mixer, neither will cause serious problems.

The signal at 1.056 GHz delivered from 1/6.5 frequency divider does not have a duty ratio of 1:1 according to the configuration used in the current description. Therefore, this signal at 1.056 GHz includes a second harmonic component at 2.112 GHz. When switch 7 selects 1.056 GHz, this second harmonic component is also supplied to single side-band mixer 8, causing the same to generate sum frequencies of these and 3.423 GHz and differential frequencies therebetween as spurious. The differential frequency between 3.432 GHz and the second harmonic of 1.056 GHz is 1.320 GHz, while the sum frequency is 5.544 GHz. Since they are sufficiently away from the band used for communications, they will not cause any serious problems.

Figure 3:
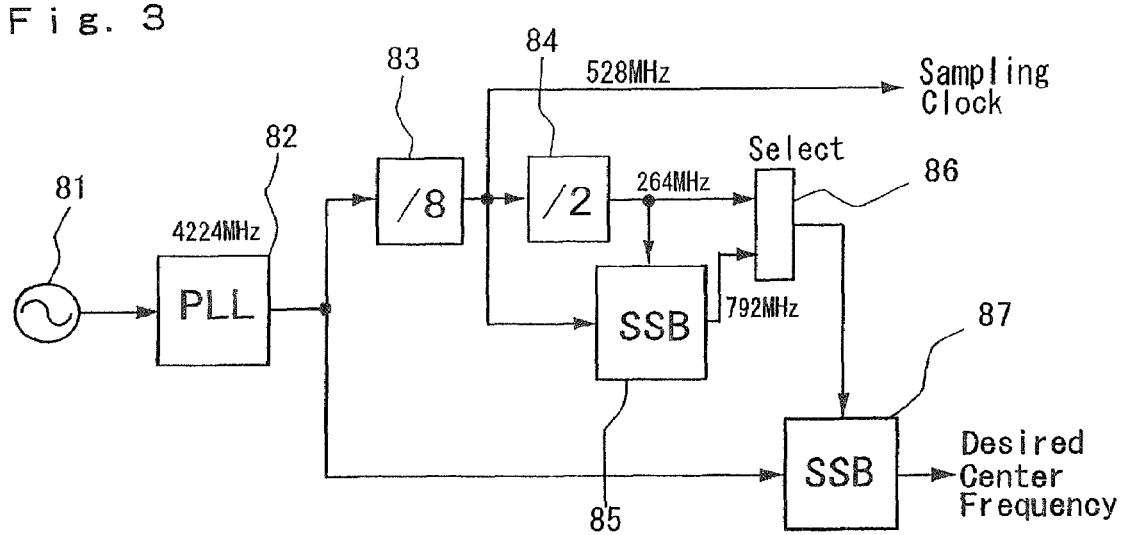
FIG. 3 is a diagram illustrating a conventional local signal generator which supports fast hopping.

Comparing of the configuration described above with the related art illustrated in FIG. 3, the foregoing configuration is advantageous as regards the chip area and power consumption because it only requires one single side-band mixer which occupies a large area and consumes a large amount of power. Also, in regard to the frequency of the source oscillator, the configuration illustrated in FIG. 3 requires two channels of 4.224 GHz which shift in phase by 90 degrees. Generally, the generation of them involves oscillating an oscillator at 8.448 GHz, which is a frequency twice as high as 4.224 GHz, dividing this frequency by two, and producing a component which shifts in phase by 90 degrees. Specifically, 8.448 GHz is required as the frequency of the source oscillator. In contrast, when the present invention is employed, the frequency of the source oscillator is 6.864 GHz, and can be lower than that in the configuration illustrated in FIG. 3. This is advantageous in regard to manufacturing cost and power consumption.

The effects as described above can be universally provided when a configuration similar to that illustrated in FIG. 4 is used, when arbitrary frequency f1 is used instead of 3.432 GHz, when arbitrary frequency f2 is used instead of 528 MHz, and when frequency f3 is used instead of 1.056 GHz, where there is a relationship expressed by $2 \times f2 = f3$, and where f1, f1+f2, f1+f3 are generated as output frequencies. Alternatively, the effects can be universally provided as well when a configuration similar to that illustrated in FIG. 4 is used, when arbitrary frequency f1 is used instead of 3.432 GHz, when arbitrary frequency f2 is used instead of 528 MHz, and when frequency f3 is used instead of 1.056 GHz, where there is a relationship expressed by $2 \times f2 = f3$, and where f1, f1−f2, f1−f3 are generated as output frequencies.

In this connection, the frequency division ratio for generating frequency f1 and frequency f2 is set to one divided by an integer. Also, outputs from single side-band mixer 8 are output signals of two channels which shift in phase by approximately 90 degrees.

Figure 5:
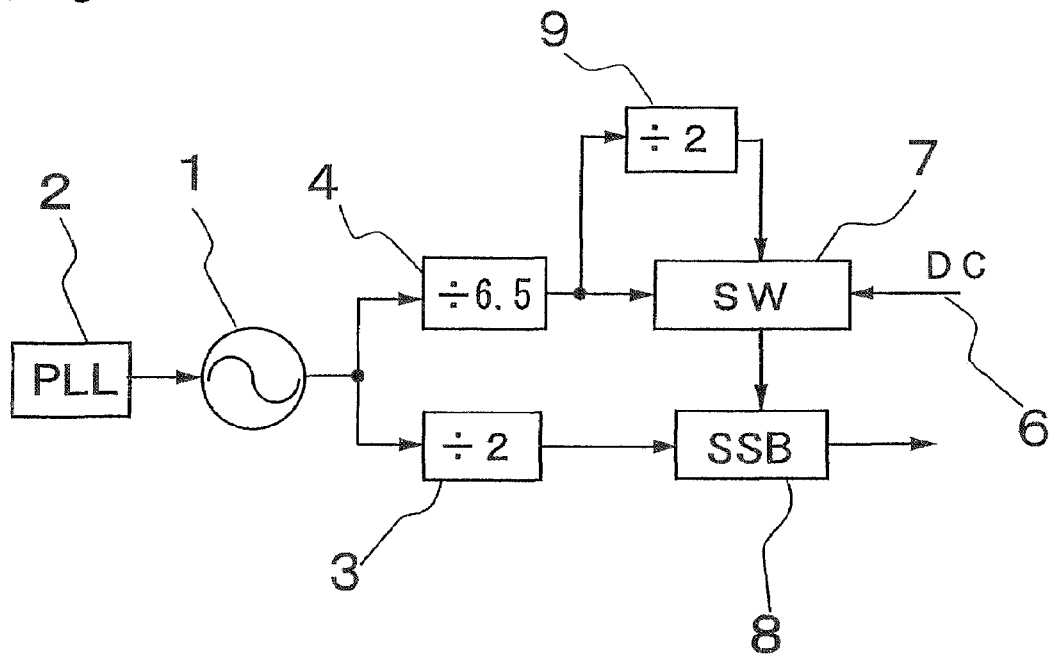
FIG. 5 is a diagram illustrating a second embodiment of a signal generator according to the present invention.

FIG. 5 is a diagram illustrating a second embodiment of a signal generator according to the present invention.

As illustrated in FIG. 5, this embodiment is substantially similar to the first embodiment illustrate in FIG. 4. A difference lies in that instead of using 1/13 frequency divider 5, the output of 1/6.5 frequency divider 4 is divided by 1/2 frequency divider 9 by two to generate signals of two channels at 528 MHz which have a phase difference of approximately 90 degrees therebetween. The general principal of operation, advantages provided thereby, and the like are similar to those of the first embodiment.

Figure 6:
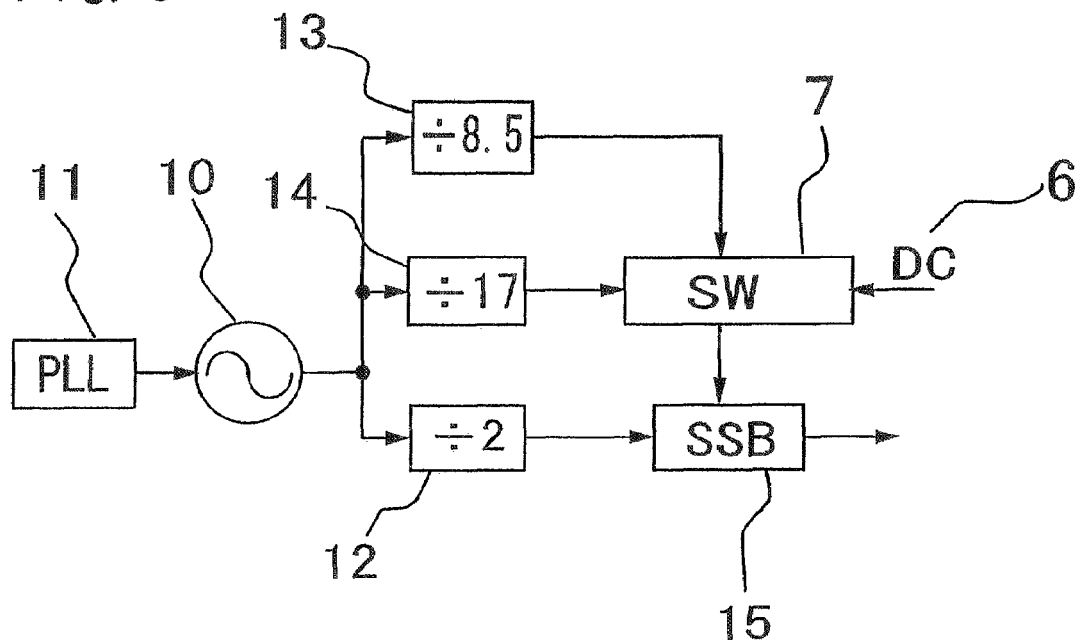
FIG. 6 is a diagram illustrating a third embodiment of a signal generator according to the present invention.

FIG. 6 is a diagram illustrating a third embodiment of a signal generator according to the present invention.

In the signal generator illustrated in FIG. 6, voltage controlled oscillator 10 is controlled by PLL 11 to generate a frequency of 8.972 GHz. 1/2 frequency divider 12 divides a signal at 8.976 GHz by two to generate signals of two channels at 4.488 GHz which have a phase difference of approximately 90 degrees therebetween, and conveys its output to single side-band mixer 15.

1/8.5 frequency divider 13 accomplishes a 1/8.5 frequency division operation by making use of both a rising edge and a falling edge of the output from voltage controlled oscillator 10, to generate signals at 1.056 GHz. The signals at 1.056 GHz after 1/8.5 frequency division are also generated to have a phase difference of approximately 90 degrees therebetween. A method therefor may employ a quite commonly employed conventional technique.

1/17 frequency divider 14 accomplishes a 1/17 frequency division operation at a duty ratio of 1:1 by making use of both the rising edge and falling edge of the output from voltage controlled oscillator 10, to generate signals at 0.528 GHz. Signals at 0.528 GHz, after 1/17 frequency division, are also generated to have a phase difference of approximately 90 degrees therebetween. A method therefor may employ a quite commonly employed conventional technique.

Switch 7 selects one from among a component at 1.056 GHz delivered from 1/8.5 frequency divider, a component at 528 MHz delivered from 1/17 frequency divider 14, and a DC signal applied to terminal 6, and supplies the selected one to single side-band mixer 15.

Single side-band mixer 15 generates a differential frequency signal between a signal at 4.488 GHz supplied from 1/2 frequency divider and a signal supplied through switch 7. Specifically, a signal at 4.488 GHz is delivered when switch 7 selects the DC signal; a signal at 3.960 is delivered when switch 7 selects 528 MHz; and a signal at 3.432 GHz is delivered when switch 7 selects 1.056 GHz. Since switching among these three frequencies is performed through the switching operation of switch 7, the switching can be carried out in an extremely short time in the order of nanoseconds. Also, since harmonics of internal signals, and spurious signals caused by image waves of single side-band mixer 15 are all at frequencies out of a desired band, this is convenient in suppressing the influence exerted on the operation of a transceiver.

Figure 7:
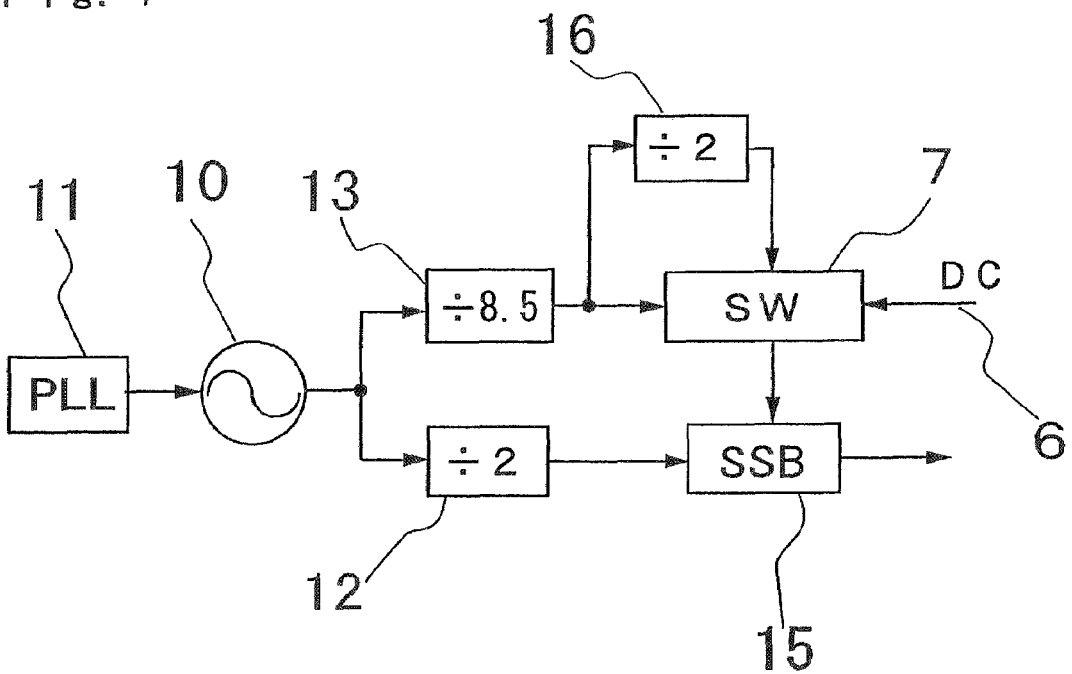
FIG. 7 is a diagram illustrating a fourth embodiment of a signal generator according to the present invention.

FIG. 7 is a diagram illustrating a fourth embodiment of a signal generator according to the present invention.

As illustrated in FIG. 7, this embodiment is substantially similar to the third embodiment illustrated in FIG. 6. A difference lies in that instead of using 1/17 frequency divider 14, the output of 1/8.5 frequency divider 13 is divided by 1/2 frequency divider 16 by two to generate signals of two channels at 528 MHz which have a phase difference of approximately 90 degrees therebetween. The general principal of operation, advantages provided thereby, and the like are similar to those of the third embodiment.

Figure 8:
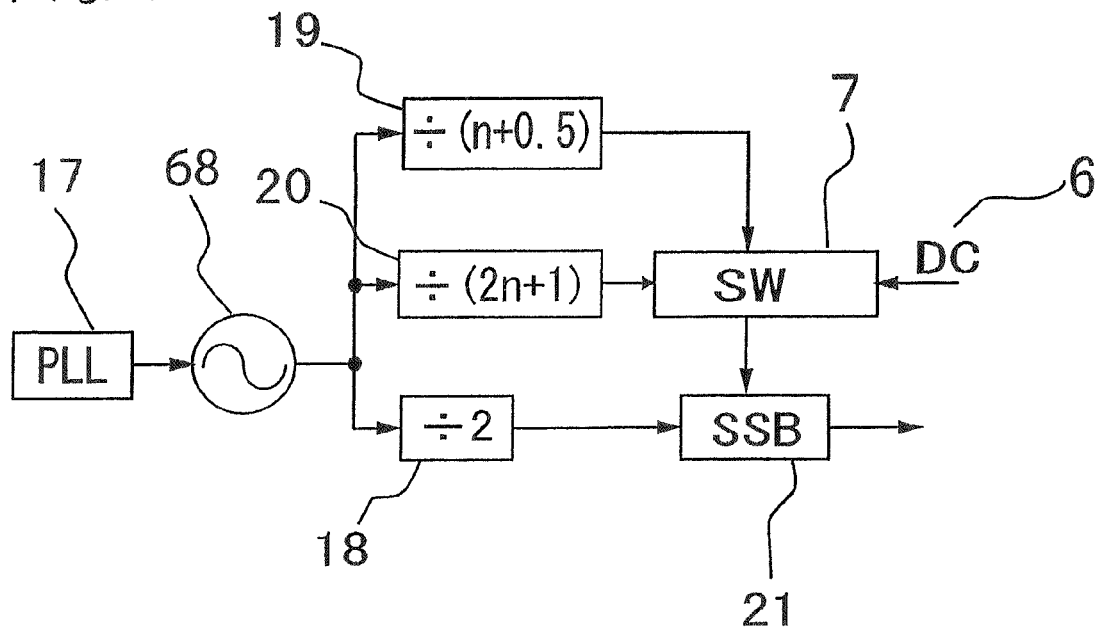
FIG. 8 is a diagram illustrating a fifth embodiment of a signal generator according to the present invention.

FIG. 8 is a diagram illustrating a fifth embodiment of a signal generator according to the present invention.

In the signal generator illustrated in FIG. 8, voltage controlled oscillator 68 is controlled by PLL 17 to generate a frequency (2n+1) times as high as 528 MHz, where n is an integer that is not negative.

1/2 frequency divider 18 divides the output of voltage controlled oscillator 68 by two to generate signals of two channels which have a phase difference of approximately 90 degrees therebetween, and conveys its output to single sideband mixer 21.

1/(n+0.5) frequency divider 19 accomplishes a 1/(n+0.5) frequency division operation by making use of both a rising edge and a falling edge of the output from voltage controlled oscillator 68, to generate signals at 1.056 GHz. Signals at 1.056 GHz, after 1/(n+0.5) frequency division, are also generated to have a phase difference of approximately 90 degrees therebetween. A method therefor may employ a quite commonly employed conventional technique.

1/(2n+1) frequency divider 20 accomplishes a 1/(2n+1) frequency division operation at a duty ratio of 1:1 by making use of both the rising edge and falling edge of the output from voltage controlled oscillator 68, to generate signals at 0.528 GHz. Signals at 0.528 GHz, after 1/(2n'1) frequency division, are also generated to have a phase difference of approximately 90 degrees therebetween. A method therefor may employ a quite commonly employed conventional technique.

Switch 7 selects one from among a component at 1.056 GHz delivered from 1/(n+0.5) frequency divider 19, a component at 528 MHz delivered from 1/(2n+1) frequency divider 20, and a DC signal applied at terminal 6, and supplies the selected one to single side-band mixer 21.

Single side-band mixer 21 generates the sum frequency signal of a signal at (2n+1)×264 MHz supplied from 1/2 frequency divider 18 and a signal supplied through switch 7. Specifically, one of the three output frequencies is selected by the selection operation of switch 7, where the switching is completed in an extremely short time on the order of nanoseconds.

Figure 9:
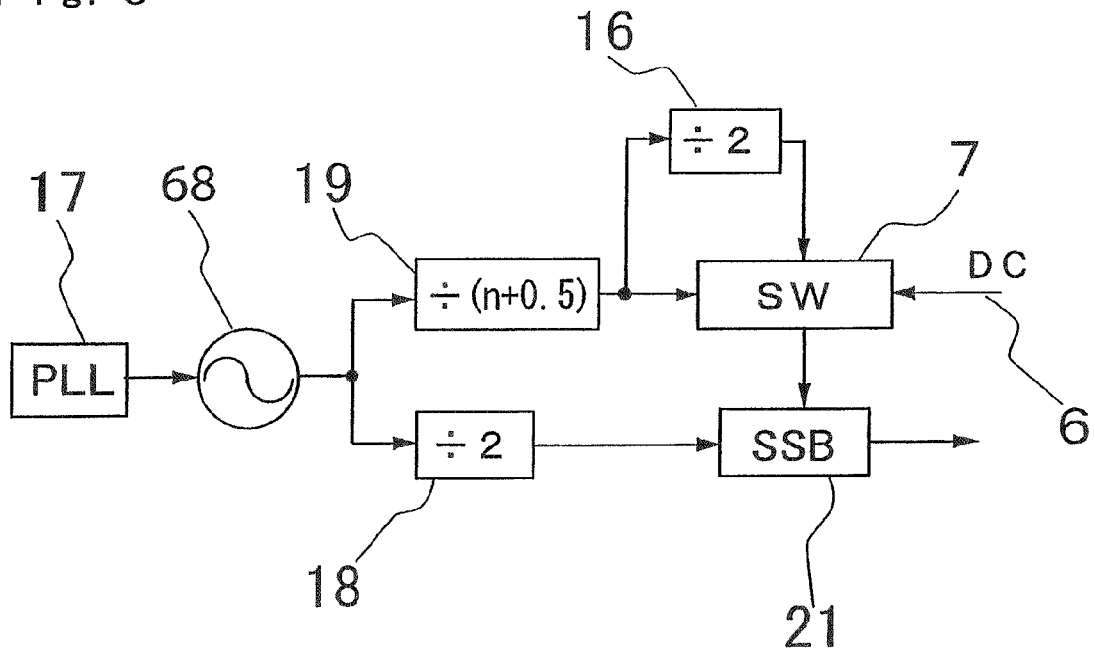
FIG. 9 is a diagram illustrating a sixth embodiment of a signal generator according to the present invention.

FIG. 9 is a diagram illustrating a sixth embodiment of a signal generator according to the present invention.

As illustrated in FIG. 9, this embodiment is substantially similar to the fifth embodiment illustrated in FIG. 8. A difference lies in that instead of using 1/(2n+1) frequency divider 20, the output of 1/(n+0.5) frequency divider 19 is divided by 1/2 frequency divider 16 by two to generate signals of two channels at 528 MHz which have a phase difference of approximately 90 degrees therebetween.

In this connection, the value of n in the aforementioned fifth and sixth embodiments can be selected to fall within a range of 3.1 to 10.6 GHz which is freed as a consumer available band of UWB, where n can be an integer from 6 to 17.

Figure 10:
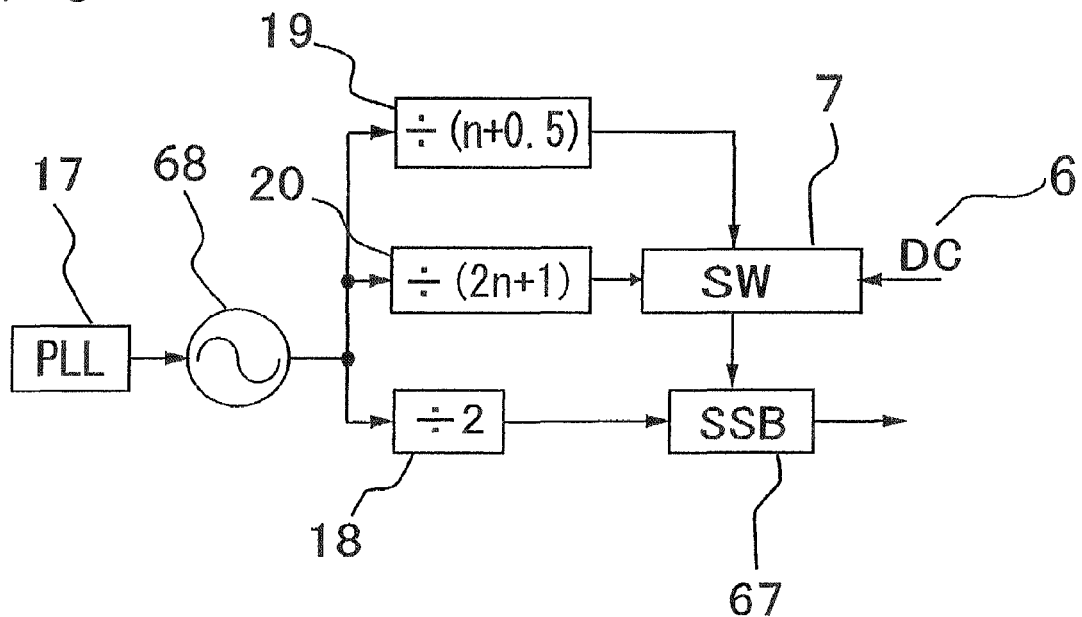
FIG. 10 is a diagram illustrating a seventh embodiment of a signal generator according to the present invention.

FIG. 10 is a diagram illustrating a seventh embodiment of a signal generator according to the present invention.

As illustrated in FIG. 10, this embodiment is substantially similar to the fifth embodiment illustrated in FIG. 8. A difference lies in that instead of single side-band mixer 21 for generating a sum frequency signal of (2n+1)×264 MHz supplied from 1/2 frequency divider 18 and a signal supplied through switch 7, single side-band mixer 67 is used for generating a differential frequency therebetween.

Figure 11:
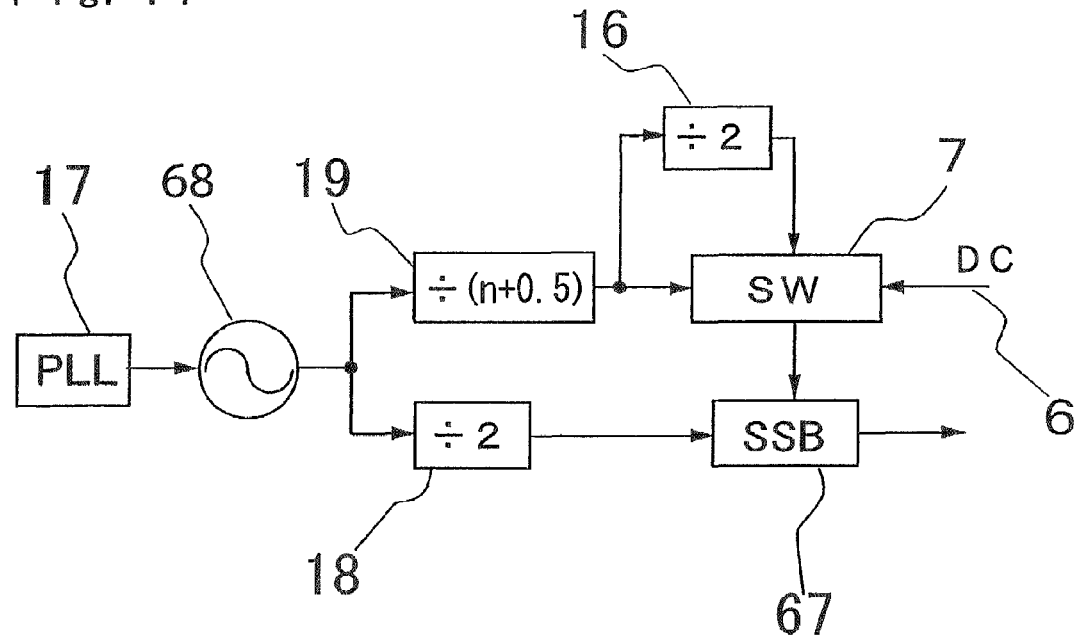
FIG. 11 is a diagram illustrating an eighth embodiment of a signal generator according to the present invention.

FIG. 11 is a diagram illustrating an eighth embodiment of a signal generator according to the present invention.

As illustrated in FIG. 11, this embodiment is substantially similar to the seventh embodiment illustrated in FIG. 10. A difference lies in that instead of using 1/(2n+1) frequency divider 20, the output of 1/(n+0.5) frequency divider 19 is divided by 1/2 frequency divider 16 by two to generate signals of two channels at 528 MHz which have a phase difference of approximately 90 degrees therebetween.

In this connection, the value of n in the aforementioned seventh and eighth embodiment can be selected to fall within a range of 3.1 to 10.6 GHz which is freed as a consumer available band of UWB, where n can be an integer from 8 to 19.

Figure 12:
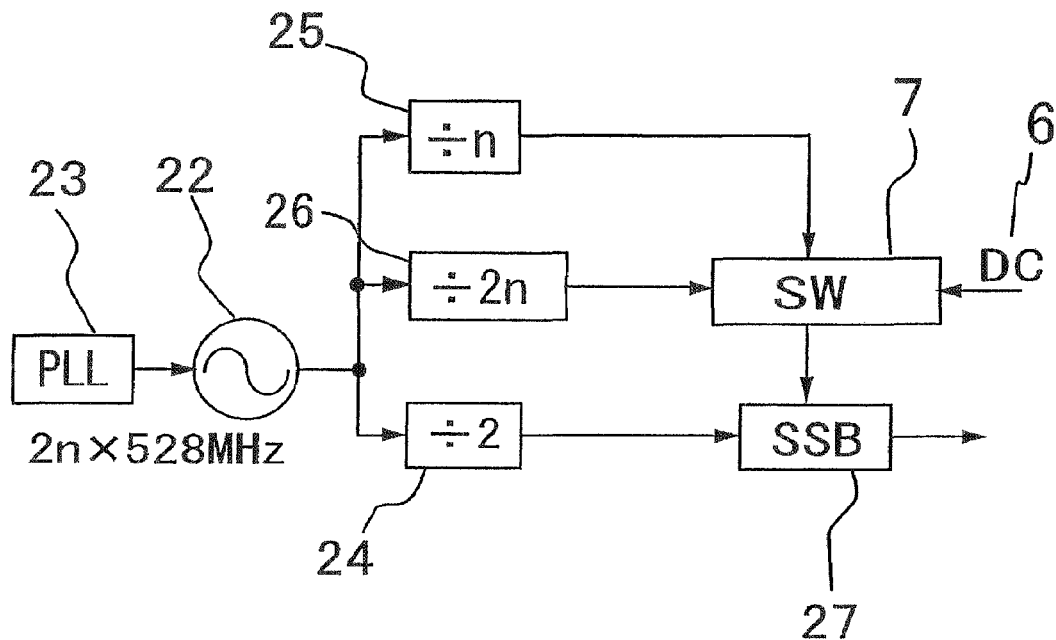
FIG. 12 is a diagram illustrating a ninth embodiment of a signal generator according to the present invention.

FIG. 12 is a diagram illustrating a ninth embodiment of a signal generator according to the present invention.

In the signal generator illustrated in FIG. 12, voltage controlled oscillator 22 is controlled by PLL 23 to generate a frequency of 528 MHz multiplied by 2n, where n is a positive integer.

1/2 frequency divider 24 divides the output of voltage controlled oscillator 22 by two to generate signals of two channels which have a phase difference of approximately 90 degrees therebetween, and conveys its output to single sideband mixer 27.

1/n frequency divider 25 generates signals at 1.056 GHz. These signals are also generated to have a phase difference of approximately 90 degrees therebetween. A method therefor may employ a quite commonly employed conventional technique.

1/2 n frequency divider 26 generates signals at 0.528 GHz. These signals are also generated to have a phase difference of approximately 90 degrees therebetween. A method therefor may employ a quite commonly employed conventional technique.

Switch 7 selects one from among a component at 1.056 GHz delivered from 1/n frequency divider 25, a component at 528 MHz delivered from 1/2 n frequency divider 26, and a DC signal applied to terminal 6, and supplies the selected one to single side-band mixer 27.

Single side-band mixer 27 generates a sum frequency signal of n×528 MHz supplied from 1/2 frequency divider 24 and a signal supplied through switch 7. Specifically, one of three types of output frequencies is selected through the selection operation of switch 7, where switching is completed in an extremely short time in the order of nanoseconds.

In this event, the value of n can be selected to fall within a range of 3.1 to 10.6 GHz which is freed as a consumer available band of UWB, where n can be an integer from 6 to 18.

Alternatively, single side-band mixer 27 used herein may generate a differential frequency signal between n×528 MHz supplied from 1/2 frequency divider 24 and a signal supplied through switch 7. In this event, one of three types of output frequencies is selected through the selection operation of switch 7 as well, where switching is completed in an extremely short time in the order of nanoseconds.

In this event, the value of n can be selected to fall within a range of 3.1 to 10.6 GHz which is freed as a consumer available band of UWB, where n can be an integer from 8 to 20.

Figure 13:
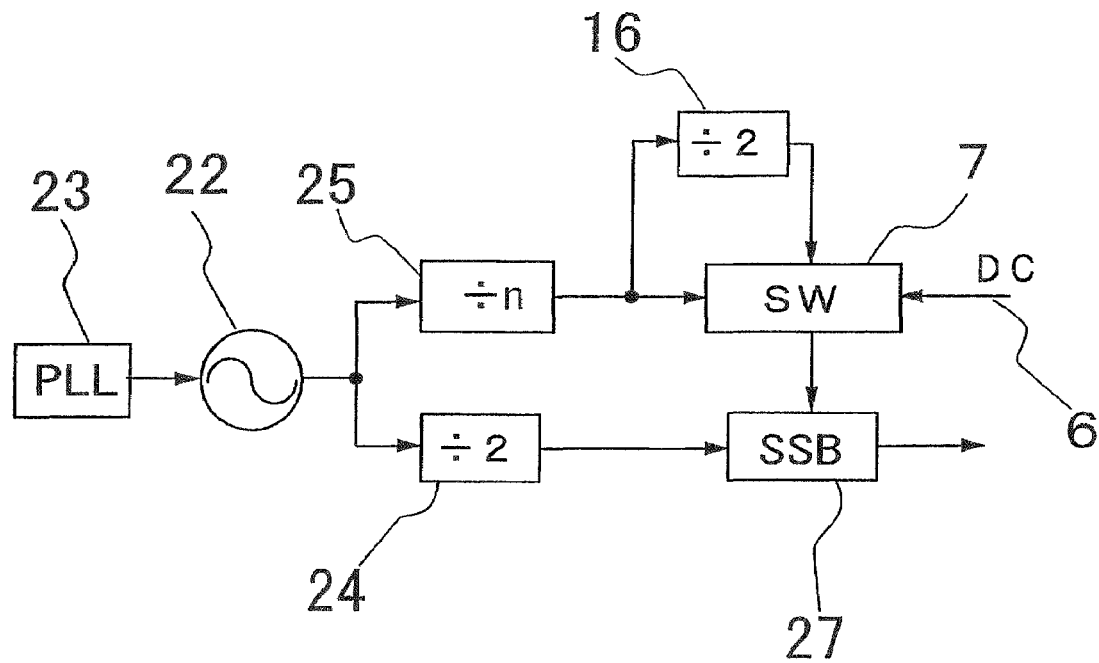
FIG. 13 is a diagram illustrating a tenth embodiment of a signal generator according to the present invention.

FIG. 13 is a diagram illustrating a tenth embodiment of a signal generator according to the present invention.

As illustrated in FIG. 13, this embodiment is substantially similar to the ninth embodiment illustrated in FIG. 12. A difference lies in that instead of using 1/2 n frequency divider 26, the output of 1/n frequency divider 25 is divided by 1/2 frequency divider 16 by two to generate signals of two channels at 528 MHz which have a phase difference of approximately 90 degrees therebetween.

Figure 14:
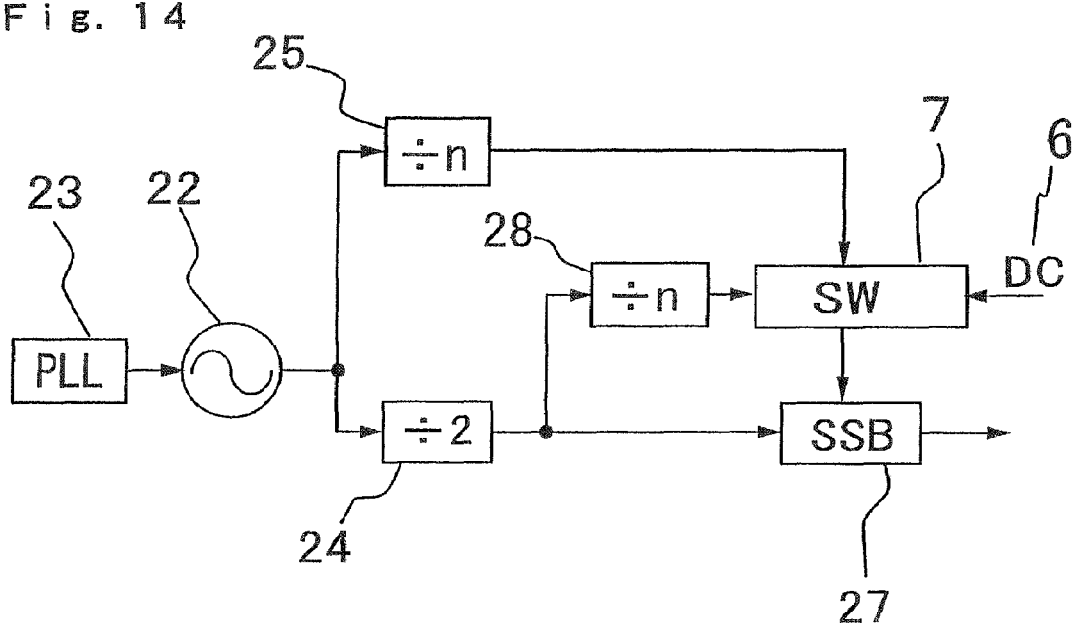
FIG. 14 is a diagram illustrating an eleventh embodiment of a signal generator according to the present invention.

FIG. 14 is a diagram illustrating an eleventh embodiment of a signal generator according to the present invention.

As illustrated in FIG. 14, this embodiment is substantially similar to the ninth embodiment illustrated in FIG. 12. A difference lies in that instead of using 1/2 n frequency divider 26, the output of 1/2 frequency divider 24 is divided by 1/n frequency divider 28 by n to generate signals of two channels at a frequency of 528 MHz which have a phase difference of approximately 90 degrees therebetween. In this connection, 1/n frequency divider 28 may operate with a clock which may be one channel of a single-phase signal or one channel of a differential signal in the output of 1/2 frequency divider 24. Alternatively, 1/n frequency divider 28 may operate with a clock which may be two channels of single-phase signals or two channels of differential signals, i.e., four-phase signals in the output of 1/2 frequency divider 24.

Figure 15:
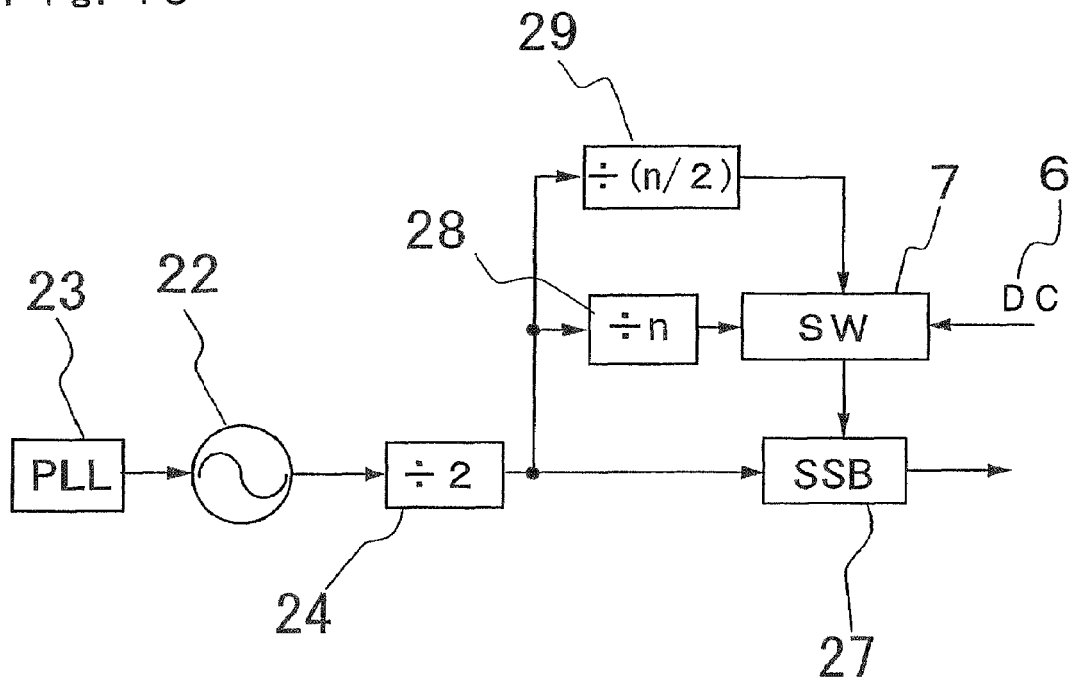
FIG. 15 is a diagram illustrating a twelfth embodiment of a signal generator according to the present invention.

FIG. 15 is a diagram illustrating a twelfth embodiment of a signal generator according to the present invention.

As illustrated in FIG. 15, this embodiment is substantially similar to the eleventh embodiment illustrated in FIG. 14. A difference lies in that instead of using 1/n frequency divider 25, the output of 1/2 frequency divider 24 is divided by 1/(n/2) frequency divider 29 by (n/2) to generate signals of two channels at 1.056 GHz which have a phase difference of approximately 90 degrees therebetween.

Figure 16:
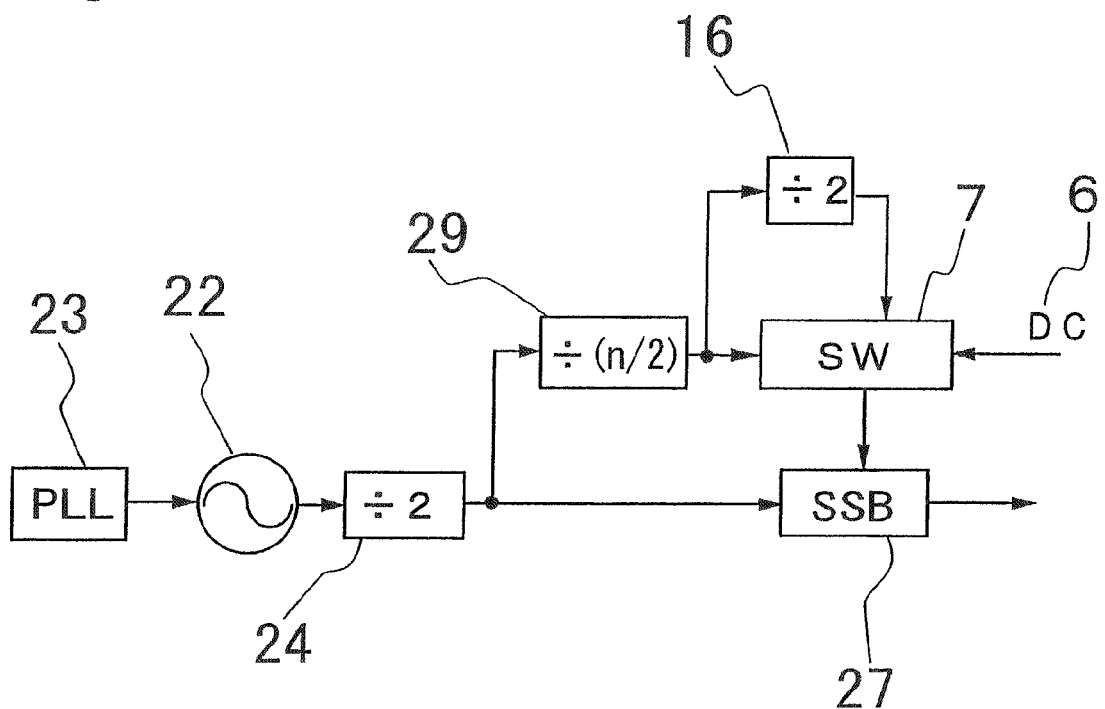
FIG. 16 is a diagram illustrating a thirteenth embodiment of a signal generator according to the present invention.

FIG. 16 is a diagram illustrating a thirteenth embodiment of a signal generator according to the present invention.

As illustrated in FIG. 16, this embodiment is substantially similar to the twelfth embodiment illustrated in FIG. 15. A difference lies in that instead of using 1/n frequency divider 28, the output of 1/(n/2) frequency divider 29 is divided by 1/2 frequency divider 16 by two, thereby generating signals of two channels at 528 MHz which have a phase difference of approximately 90 degrees therebetween.

Figure 17:
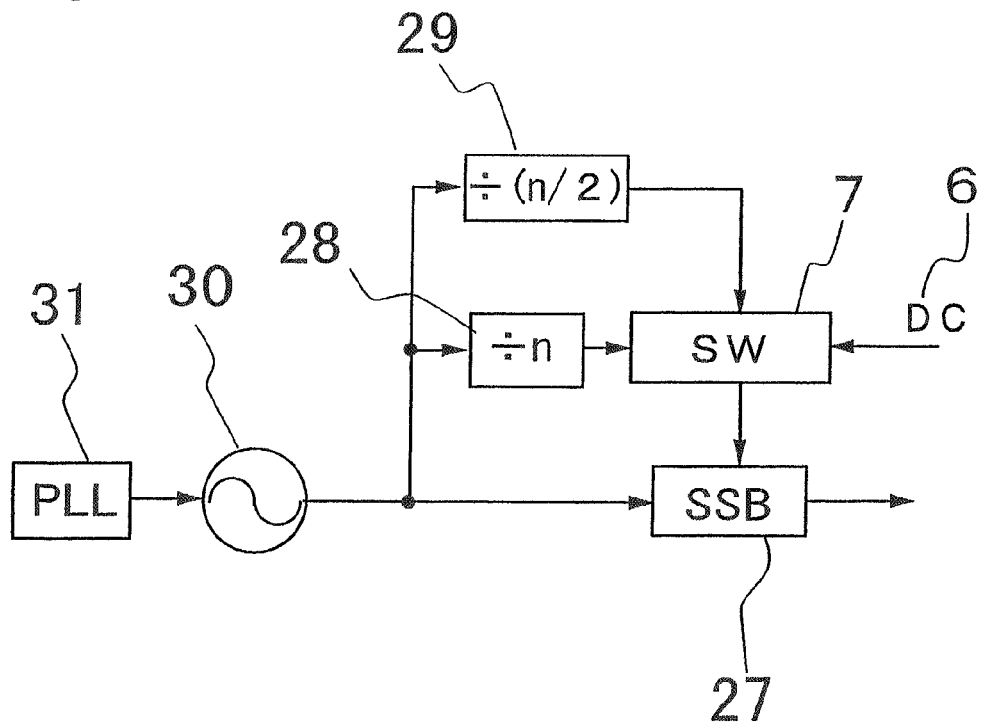
FIG. 17 is a diagram illustrating a fourteenth embodiment of a signal generator according to the present invention.

FIG. 17 is a diagram illustrating a fourteenth embodiment of a signal generator according to the present invention.

As illustrated in FIG. 17, this embodiment is substantially similar to the twelfth embodiment illustrated in FIG. 15. A difference lies in that four-phase voltage controlled oscillator 30 is used for generating four-phase signals which shift in phase by 90 degrees from one another, and this is controlled by PLL 31, thereby omitting 1/2 frequency divider 24 shown in FIG. 15. This configuration can also provide signals of two channels at n×528 MHz which have a phase difference of approximately 90 degrees therebetween.

Figure 18:
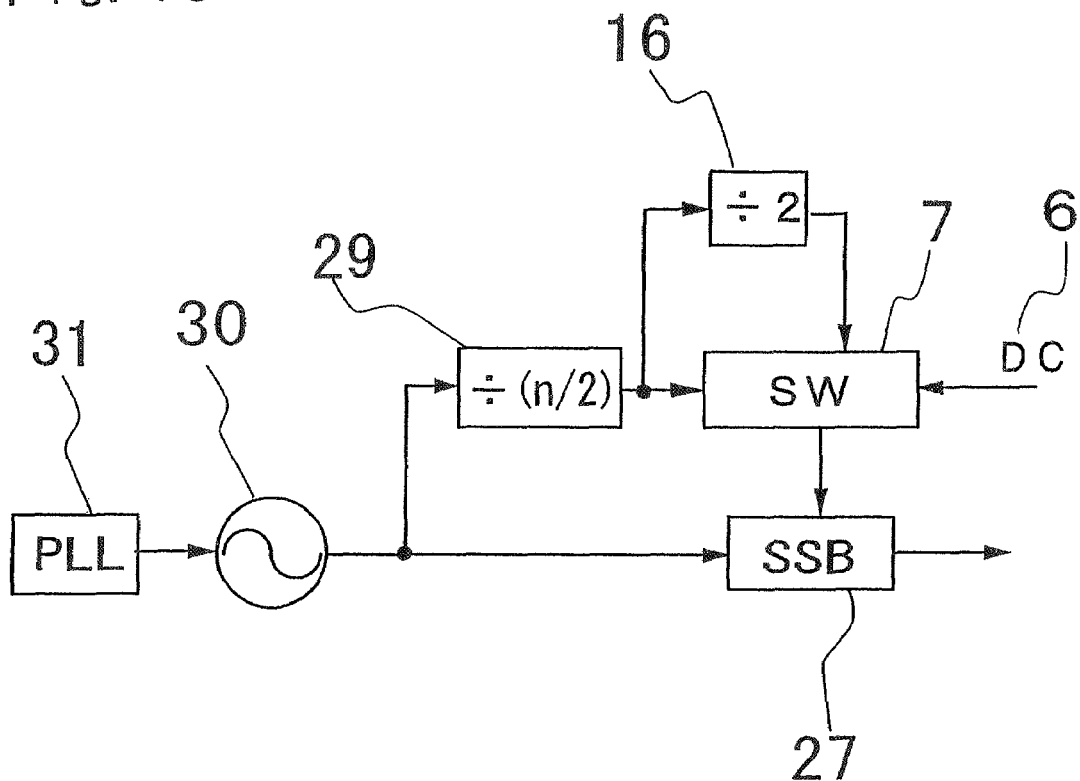
FIG. 18 is a diagram illustrating a fifteenth embodiment of a signal generator according to the present invention.

FIG. 18 is a diagram illustrating a fifteenth embodiment of a signal generator according to the present invention.

As illustrated in FIG. 18, this embodiment is substantially similar to the fourteenth embodiment illustrated in FIG. 17. A difference lies in that instead of using 1/n frequency divider 28, the output of 1/(n/2) frequency divider 29 is divided by 1/2 frequency divider 16 by two, thereby generating signals of two channels at 528 MHz which have a phase difference of approximately 90 degrees therebetween.

In this connection, it is apparent that the frequencies 264 MHz, 528 MHz, 1.056 GHz described in the aforementioned fifth to fifteenth embodiments may be generalized as f4, 2×f4, 4×f4, respectively in their implementations, without any inconvenience resulting therefrom, to provide similar effects.

Also, the value of n in the aforementioned ninth to fifteenth embodiments can be selected to fall within a range of 3.1 to 10.6 GHz which is freed as a consumer available band of UWB, where n can be, for example, an integer from 11 to 17 or an integer from 13 to 19, or the like.

Figure 19:
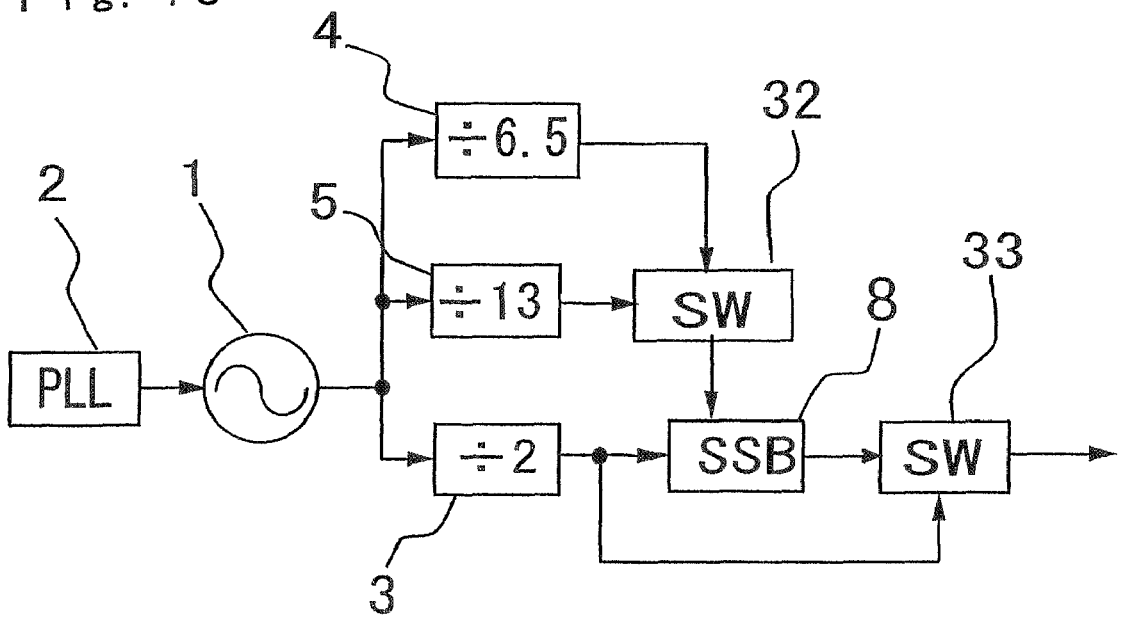
FIG. 19 is a diagram illustrating a sixteenth embodiment of a signal generator according to the present invention.

FIG. 19 is a diagram illustrating a sixteenth embodiment of a signal generator according to the present invention.

In the signal generator illustrated in FIG. 19, voltage controlled oscillator 1 is frequency locked by PLL 2, and generates a signal at a frequency of 6.864 GHz.

1/2 frequency divider 3 divides this 6.864 GHz by two to generate signals of two channels at 3.432 GHz which have a phase difference of approximately 90 degrees therebetween, and delivers its output to single side-band mixer 8 and switch 33. 1/6.5 frequency divider 4 accomplishes a 1/6.5 frequency division operation by making use of both a rising edge and a falling edge of the output from voltage controlled oscillator 1, to generate signals at 1.056 GHz. The signals at 1.056 GHz, after 1/6.5 frequency division, are also generated to have a phase difference of approximately 90 degrees therebetween. A method therefor may employ a quite commonly employed conventional technique.

1/13 frequency divider 5 accomplishes a 1/13 frequency division operation at a duty ratio of 1:1 by making use of both the rising edge and falling edge of the output from voltage controlled oscillator 1, to generate signals at 0.528 GHz. The signals at 0.528 GHz, after 1/13 frequency division, are also generated to have a phase difference of approximately 90 degrees therebetween. A method therefor may employ a quite commonly employed conventional technique.

Switch 32 selects one of a component at 1.056 GHz delivered from 1/6.5 frequency divider and a component at 528 MHz delivered from 1/13 frequency divider 5, and supplies the selected one to single side-band mixer 8.

Single side-band mixer 8 generates a sum frequency signal of 3.432 GHz supplied from 1/2 frequency divider 3 and a signal supplied through switch 32. Specifically, single side-band mixer 8 delivers a signal at 3.960 GHz when switch 32 selects 528 MHz, and single side-band mixer 8 delivers a signal at 4.488 GHz when switch 32 selects 1.056 GHz.

Switch 33 selects and delivers one of the output of single side-band mixer 8 and the output of 1/2 frequency divider 3. According to the foregoing configuration, switching among the desired three frequencies is carried out through the switching operations of switch 32 and switch 33, so that switching can be made in an extremely short time in the order of nanoseconds. Also, since harmonics of internal signals, and spurious signals caused by image waves of single side-band mixer 15 are all at frequencies out of a desired band, this is convenient in suppressing the influence exerted on the operation of a transceiver.

Figure 20:
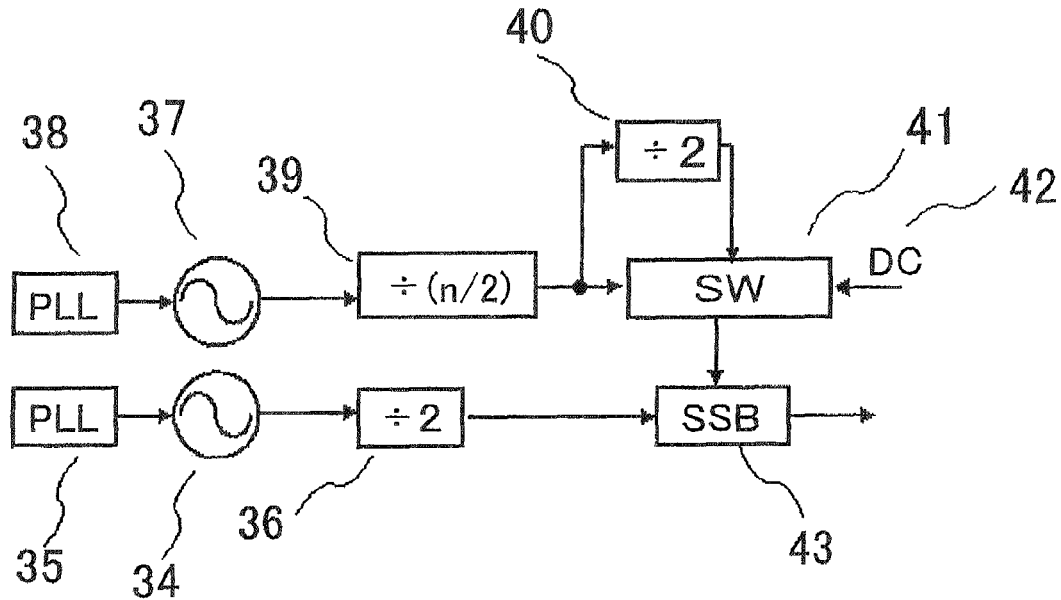
FIG. 20 is a diagram illustrating a seventeenth embodiment of a signal generator according to the present invention.

FIG. 20 is a diagram illustrating a seventeenth embodiment of a signal generator according to the present invention.

In the signal generator illustrated in FIG. 20, voltage controlled oscillator 34 is frequency locked by PLL 35, and its output is divided by 1/2 frequency divider 36 by two to generate signals of two channels which have a phase difference of approximately 90 degrees therebetween.

Voltage controlled oscillator 37 is frequency locked by PLL 38, and its output is divided by 1/(n/2) frequency divider 39 by (n/2) to generate signals of two channels which have a phase difference of approximately 90 degrees therebetween.

The output of 1/(n/2) frequency divider 39 is again divided by 1/2 frequency divider by two to simultaneously generate signals of two channels which have a phase difference of approximately 90 degrees therebetween. Then, one channel signal is selected by switch 41 from among the output of 1/(n/2) frequency divider 39, the output of 1/2 frequency divider, and a DC signal applied to input terminal 42 of switch 41. Single side-band mixer 43 generates and delivers a sum frequency of a signal selected by switch 41 and a signal delivered from 1/2 frequency divider 36. Alternatively, single side-band mixer 43 used herein may generate and deliver a differential frequency between a signal selected by switch 41 and the signal delivered from 1/2 frequency divider 36.

Figure 21:
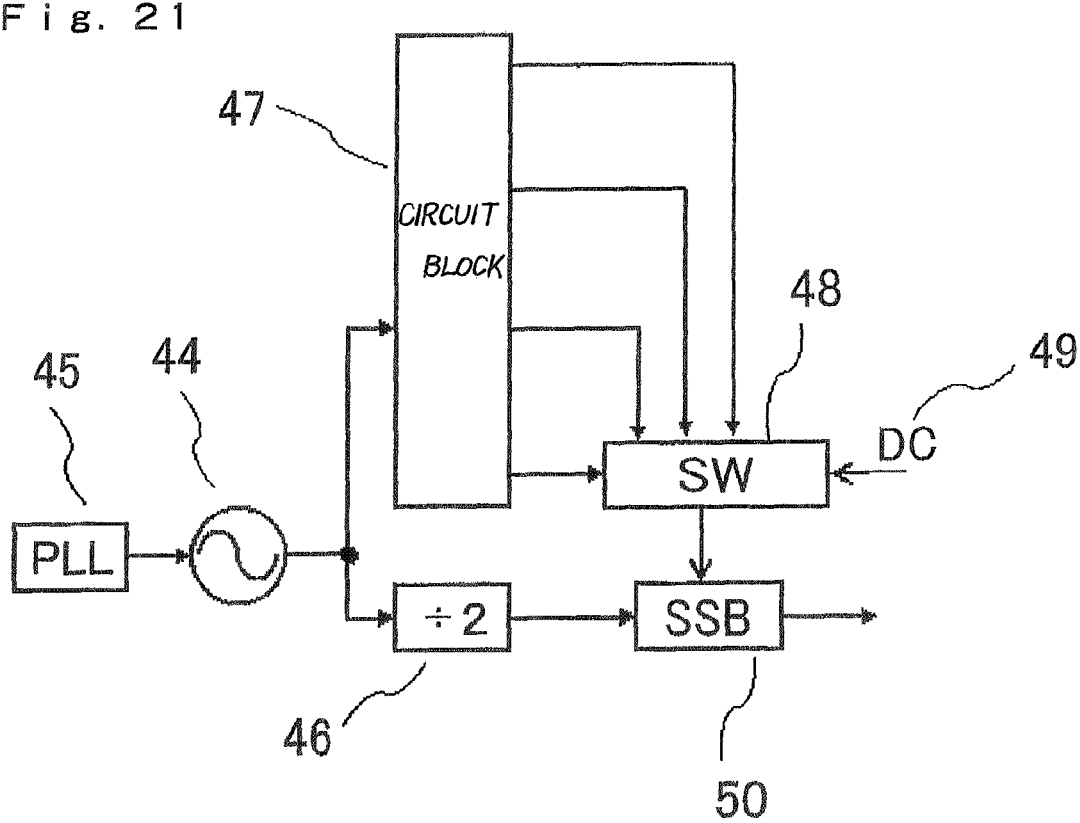
FIG. 21 is a diagram illustrating an eighteenth embodiment of a signal generator according to the present invention.

FIG. 21 is a diagram illustrating an eighteenth embodiment of a signal generator according to the present invention.

In the eighteenth embodiment illustrated in FIG. 21, voltage controlled oscillator 44 is frequency locked by PLL 45, and generates a signal at frequency f0.

1/2 frequency divider 46 divides this signal at frequency f0 by two to generate a signal at frequency f1 which is provided in two channels that have a phase difference of approximately 90 degrees therebetween, and conveys its output to single side-band mixer 50.

Circuit block 47 receives the signal at frequency f0 generated in voltage controlled oscillator 44, and generates signals at frequencies f2, f3, f4, f5, each of which is simultaneously provided in two channels which have a phase difference of approximately 90 degrees therebetween. The respective frequencies have relationships expressed by f3=2×f2, f4=3×f2, and f5=4×f2.

Switch 48 selects one of components at frequencies f2, f3, f4, f5 and a DC signal applied to terminal 49, and supplies the selected one to single side-band mixer 50.

Single side-band mixer 50 generates a sum frequency signal of the signal at frequency f1 supplied from 1/2 frequency divider 46 and a signal supplied through switch 47. With this configuration, five types of frequencies, f1, f1+f2, f1+f3, f1+f4, f1+f5, are generated as outputs, where switching therebetween can be made in an extremely short time.

Alternatively, single side-band mixer 50 used herein may generate and deliver a differential frequency between a signal selected by switch 48 and the signal from 1/2 frequency divider 46. Also, a configuration for generating an output at frequency f1 may utilize a switch for selecting and delivering one of the output of frequency divider 46 and the output of single side-end mixer 50.

According to this configuration, an inconvenience arises in that a component at frequency f1+3×f2, which is a spurious signal caused by a third harmonic of the component at frequency f2, matches frequency f1+f4. However, this component at frequency f1+3×f2 has a magnitude which is kept lower than other spurious signals by the mechanism described below.

Single side-band mixer 50 generates a sum frequency of basic waves applied thereto. In this event, single side-band mixer 50 exhibits a general characteristic in which nature the sum frequency is rejected in regard to mixing, one of the input signals, i.e., the third harmonic with the other basic wave. Also, the component at frequency 3×f2 included in the input signal to the mixer has a magnitude smaller than the magnitude of the component at frequency f2. Accordingly, two rejection factors act on the component at frequency f1+3×f2, which is an undesired wave, i.e., a rejection effect in single side-band mixer 50, and the component at frequency 3×f2 which is essentially smaller in magnitude than the component at frequency f2.

As a result, it is sufficiently contemplated that the intensity of f1+3×f2 falls within an allowable level from a relationship between actual device/circuit/generator designs and the required specifications of the system. In this event, this configuration is advantageous in that the image output of single side-band mixer 50 does not match any of the output frequencies of this generator.

Also advantageously, spurious signals caused by fifth harmonics of the internal signals at frequencies f2–f5 do not match any of the output frequencies of this generator. Further advantageously, spurious signals caused by third harmonics of the internal signals at frequency f2–f5 do not match any of the output frequencies of this generator except for the aforementioned component at frequency f1+3×f2.

The advantages described above can be provided in a configuration in which circuit block 47 is replaced with a circuit block which receives the signal at frequency f0, and generates signals at frequencies f2, f3, f4, each of which is simultaneously provided in two channels which have a phase difference of approximately 90 degrees therebetween, where the respective frequencies have relationships expressed by f3=2×f2 and f4=3×f2, and where the circuit block generates four frequencies f1, f1+f2, f1+f3, f1+f4 as outputs.

Figure 22:
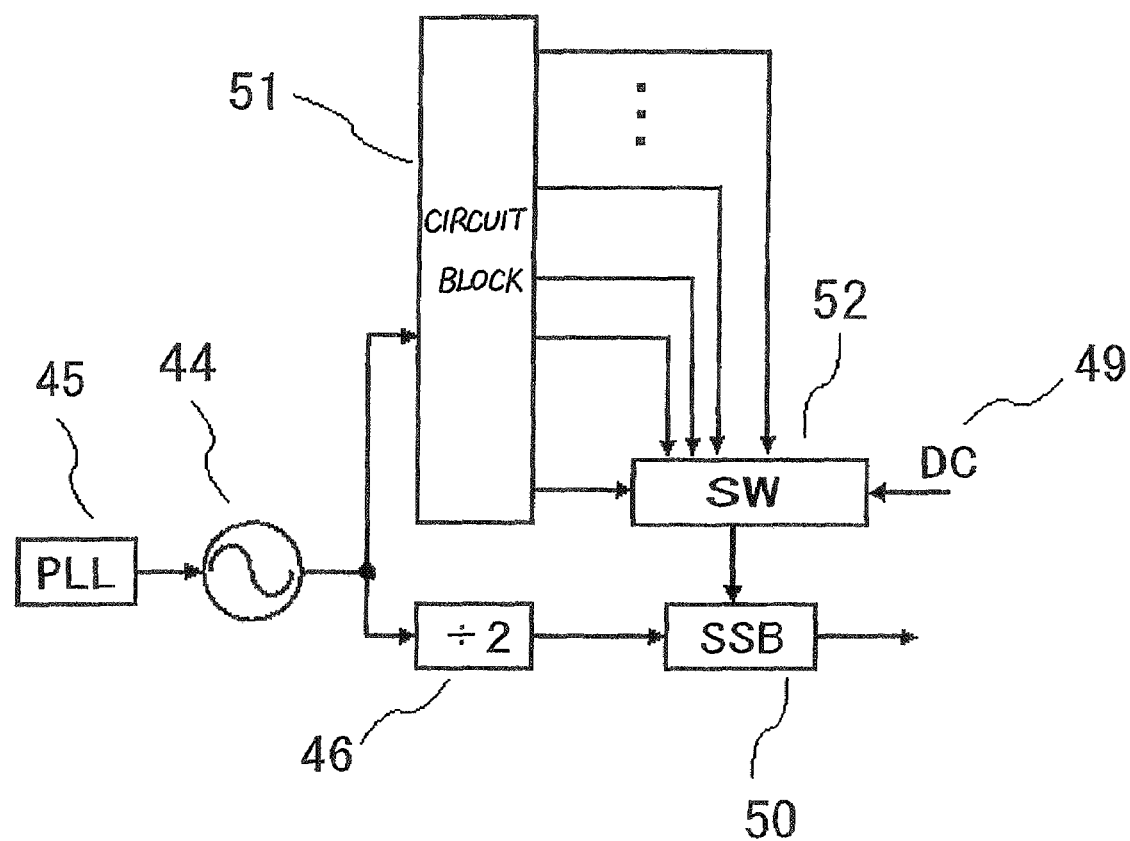
FIG. 22 is a diagram illustrating a nineteenth embodiment of a signal generator according to the present invention.

FIG. 22 is a diagram illustrating a nineteenth embodiment of a signal generator according to the present invention.

In the signal generator illustrated in FIG. 22, voltage controlled oscillator 44 is frequency locked by PLL 45, and generates a signal at frequency f0.

1/2 frequency divider 46 divides this signal by two at frequency f0 to generate a signal at frequency f1 which is provided in two channels that have a phase difference of approximately 90 degrees therebetween, and conveys its output to single side-band mixer 50.

Circuit block 51 receives the signal at frequency f0 generated in voltage controlled oscillator 44, generates (n−1) types of signals at frequencies f2–fn, each of which is provided in two channels that have a phase difference of approximately 90 degrees therebetween. Respective frequencies f3–fn are all integer multiples of f2.

Switch 52 selects one of components at frequencies f2 to fn and a DC signal applied to terminal 49, and supplies the selected one to single side-band mixer 50.

Single side-band mixer 50 generates a sum frequency signal of the signal at frequency f1 supplied from 1/2 frequency divider 46 and a signal supplied through switch 52. According to this configuration, n types of frequencies, f1, f1+f2 to f1+fn, are generated as outputs. Each of these output signals have signals of two channels which have a phase difference of approximately 90 degrees therebetween.

Alternatively, single side-band mixer 50 used herein may generate and deliver a differential frequency between a signal selected by switch 52 and the signal delivered from 1/2 frequency divider 46.

Also, a configuration for generating an output at frequency f1 may utilize a switch for selecting and delivering one of the outputs of frequency divider 46 and the output of single side-end mixer 50.

Figure 23:
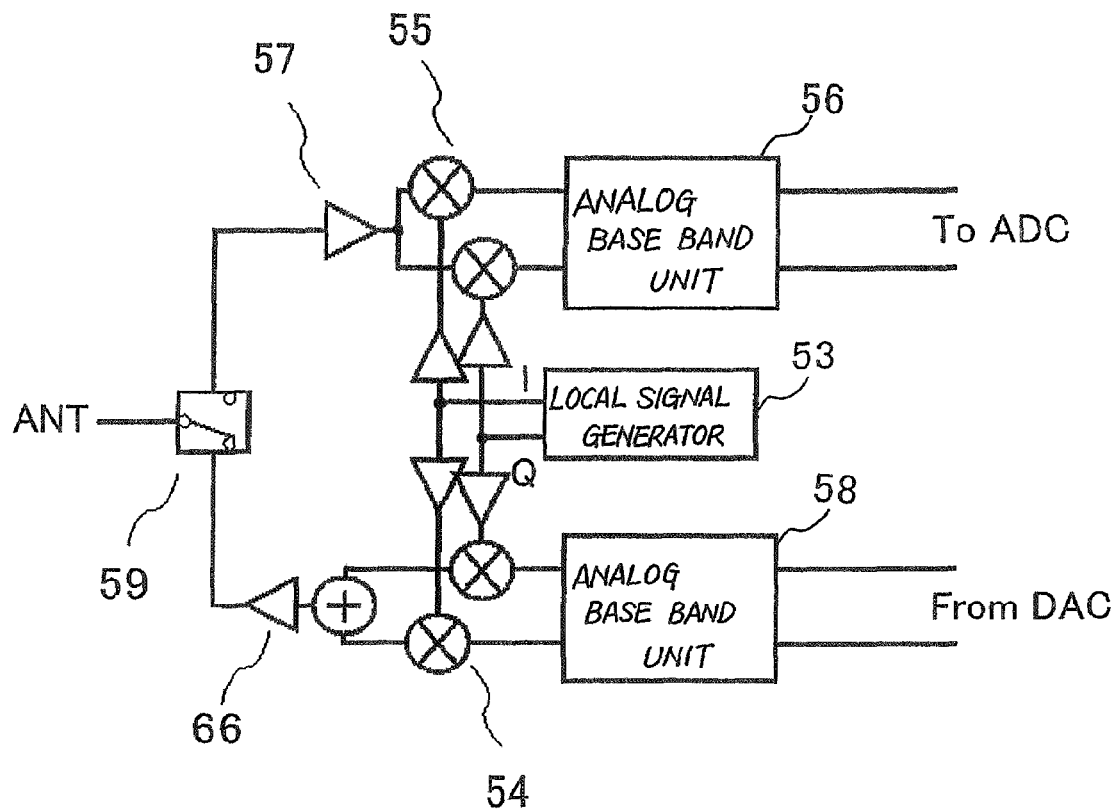
FIG. 23 is a diagram illustrating a first embodiment of a transceiver according to the present invention.

FIG. 23 is a diagram illustrating a first embodiment of a transceiver according to the present invention.

In the transceiver illustrated in FIG. 23, local signal generator 53 generates signals of two channels I, Q which shift in phase by approximately 90 degrees. These signals I, Q are supplied to orthogonal transmission mixer 54 and orthogonal reception mixer 55 through buffer amplifiers as local signals. The signal generators shown in the aforementioned first to nineteenth embodiments can be used for this local signal generator 53.

A transmitted signal is supplied to an antenna from digital/analog converter DAC through analog base band unit 58, orthogonal transmission mixer 54, amplifier 66, and switch 59. Frequency hopping of the transmitted signal is carried out by switching the frequency of the local signals generated by local signal generator 53 over time.

A received signal is supplied from the antenna to analog/digital converter ADC through switch 59, amplifier 57, orthogonal reception mixer 55, and analog base band unit 56. In this event, frequency hopped signals are received by switching the frequency of the local signals generated by local signal generator 53 over time in synchronization with the timing of the frequency hopping of the received signal.

Figure 24:
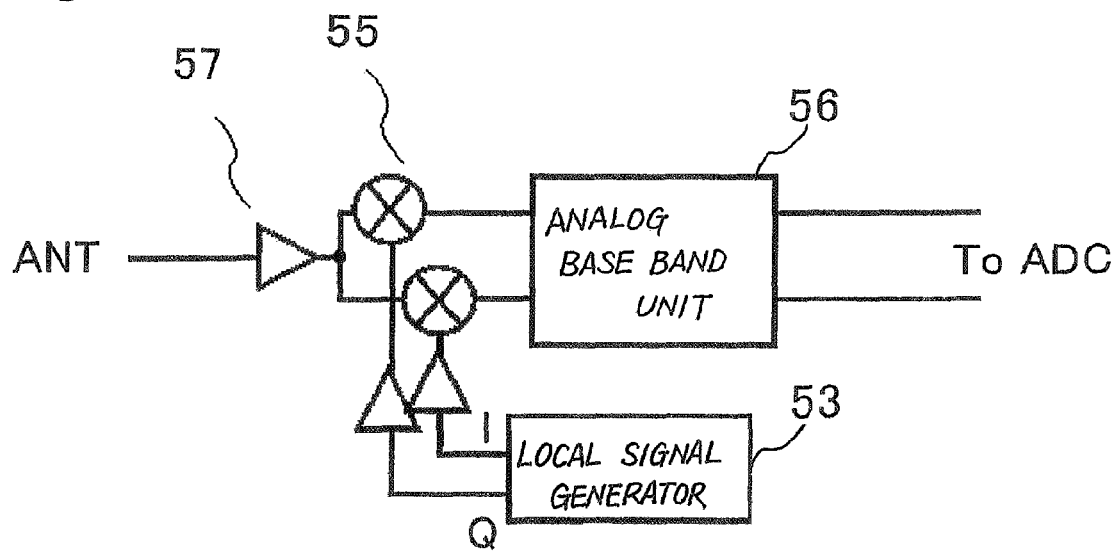
FIG. 24 is a diagram illustrating a first embodiment of a receiver according to the present invention.

FIG. 24 is a diagram illustrating a first embodiment of a receiver according to the present invention.

The receiver illustrated in FIG. 24 comprises blocks associated with reception, which are extracted from the transceiver illustrated in FIG. 23.

Figure 25:
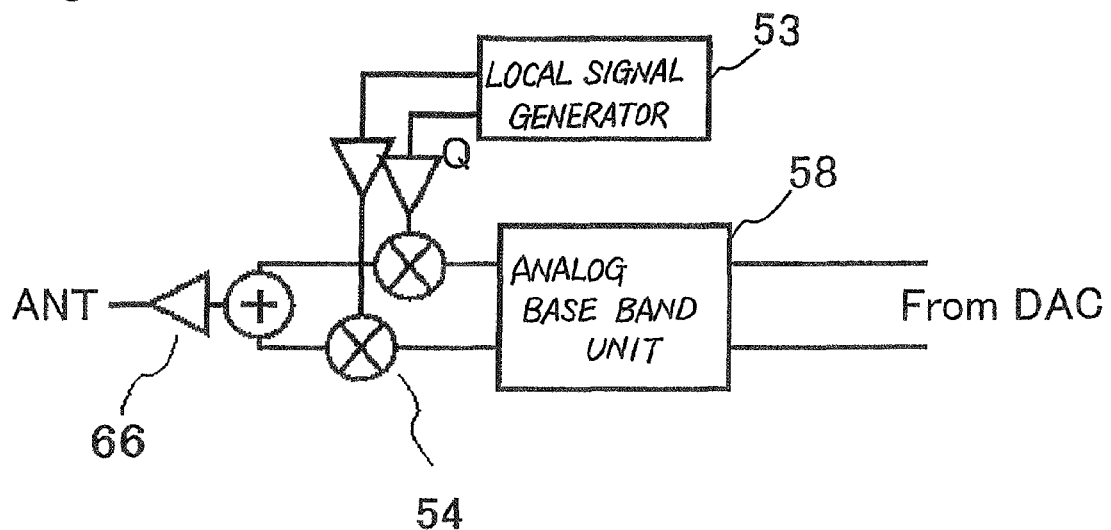
FIG. 25 is a diagram illustrating a first embodiment of a transmitter according to the present invention.

FIG. 25 is a diagram illustrating a first embodiment of a transmitter according to the present invention.

The transmitter illustrated in FIG. 25 comprises blocks associated with transmission, which are extracted from the transceiver illustrated in FIG. 23.

Figure 26:
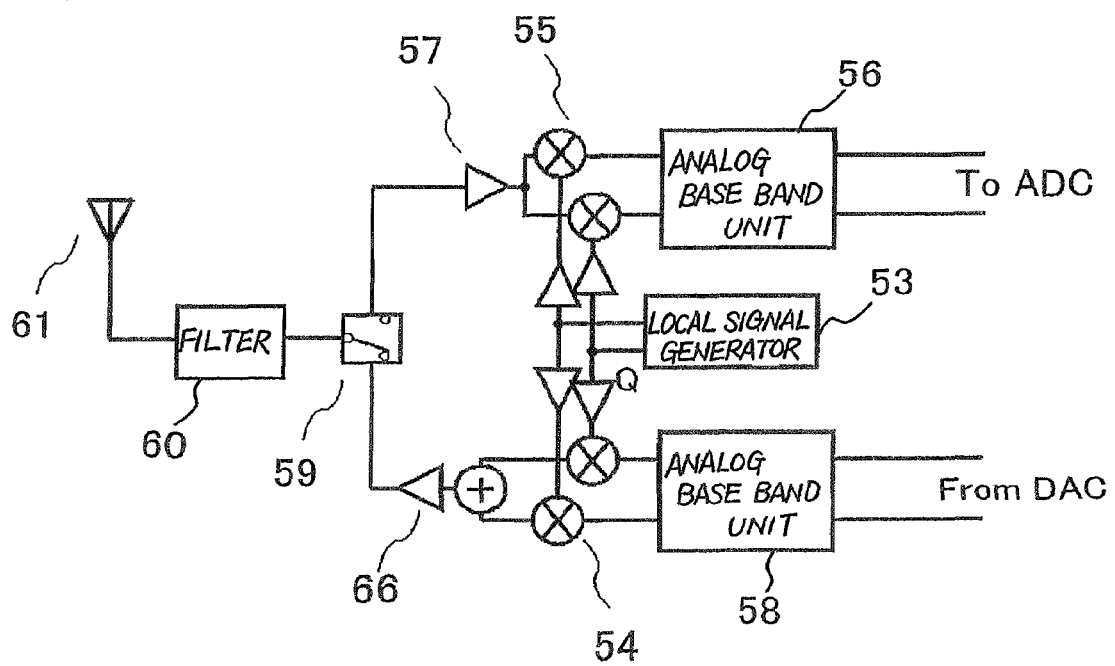
FIG. 26 is a diagram illustrating a second embodiment of a transceiver according to the present invention.

FIG. 26 is a diagram illustrating a second embodiment of a transceiver according to the present invention.

The transceiver illustrated in FIG. 26 comprises RF filter 60 which is added to the transceiver illustrated in FIG. 23. This filter 60 is a bandpass filter for passing therethrough signals in a band used for transmission/reception. This filter 60 restrains the radiation of undesired signals from antenna 61, outside of the band used for transmission/reception, which are generated in a modulation of a base band signal by components outside of the band used for transmission/reception, which are applied to orthogonal transmission mixer 54, in spurious signals generated in local signal generator 53 which is used in the present invention. Also, this filter 60 restrains components outside of the desired band, in RF signals applied to a reception system of this transceiver from antenna 61, thereby preventing the application to orthogonal reception mixer 55 of components of spurious generated in local signal generator 53 which is used in the present invention, outside of the band used for transmission/reception, and operations involved in conversion and modulation of undesired signals to base band signals.

The magnitude of the spurious signal generated in local signal generator 53 used in the present invention varies depending on variations in its manufacturing process, the type of circuits employed for an actual device, and the like. Specifically, when the magnitude of spurious signals on the higher frequency side with respect to a desired local frequency is compared with that of spurious signals on the lower frequency side, which of them becomes stronger by how much varies depending on the manufacturing process, circuit type, and the like.

Also, a tolerance in regard to the radiation of undesired signals radiated by a transmitter to the outside of a desired band is independently defined on the higher frequency side and lower frequency side of the desired band, respectively. In other words, the tolerances may be set to the same level, but may also be set to different levels.

Also, it is a general tendency that the magnitude of undesired waves received by a receiver differs on the higher frequency side and lower frequency side of a desired band. In addition to this, problems on frequency characteristics of an antenna, an amplifier in a front end unit, a mixer and the like used in a transceiver are added to this. The cutoff characteristic on the higher frequency side and the cutoff characteristic on the lower frequency side of filter 60 can be optimally set in consideration of all the factors described above. For example, the cutoff characteristics are set to attenuate undesired waves by 10 dB or more.

In an example, where the spurious signals generated in local signal generator 53 includes components having a higher magnitude on the lower frequency side of a desired local frequency, the tolerance with respect to the radiation of undesired signals radiated by a transmitter to the outside of a desired band is set lower on the lower frequency side of the desired band, and the frequency characteristics of the antenna, the amplifier of the front end unit, and mixer fail to sufficiently reduce the gain on the lower frequency side of the desired band, filter 60 can be designed to have a sharp cutoff characteristic on the lower frequency side, thereby making it possible to reduce undesired signal radiation power to the lower frequency side than the desired band to equal to or lower than the tolerance. In this event, filter 60 can be designed to exhibit a slower cutoff characteristic on the higher frequency side, as compared with that on the lower frequency side, thereby reducing power loss and the cost of filter 60.

In another example, where the spurious signals generated in local signal generator 53 include components having a higher magnitude on the higher frequency side than a desired local frequency, a receiver receives undesired signals, having large magnitudes, at frequencies near spurious signals that are outside of the desired band, and the frequency characteristics of the antenna, the amplifier of the front end unit, and the mixer fail to sufficiently reduce the gain on the higher frequency side of the desired band, filter 60 can be designed to have a sharp cutoff characteristic on the higher frequency side, thereby making it possible to reduce the magnitude of the undesired signals received by the receiver and that are outside of the desired band, to mitigate interference caused thereby. In this event, filter 60 can be designed to exhibit a slower cutoff characteristic on the lower frequency side, as compared with that on the lower frequency side, thereby reducing power loss and cost of filter 60.

Figure 27:
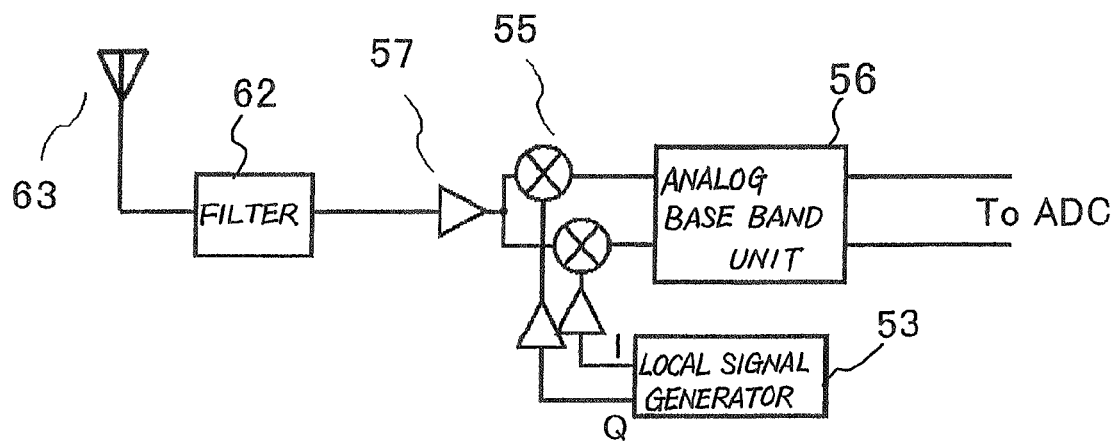
FIG. 27 is a diagram illustrating a second embodiment of a receiver according to the present invention.

FIG. 27 is a diagram illustrating a second embodiment of a receiver according to the present invention.

The receiver illustrated in FIG. 27 comprises only blocks associated with reception, which are extracted from the transceiver illustrated in FIG. 26.

Figure 28:
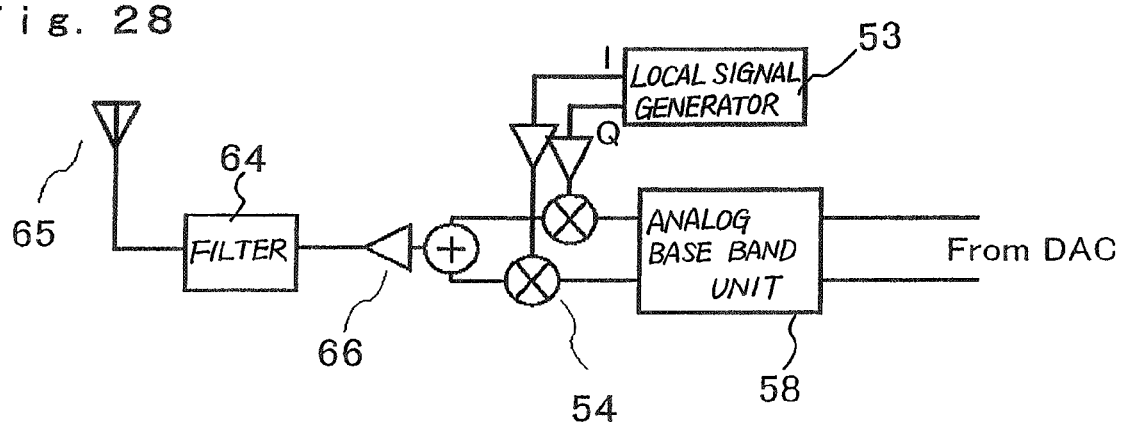
FIG. 28 is a diagram illustrating a second embodiment of a transmitter according to the present invention.

FIG. 28 is a diagram illustrating a second embodiment of a transmitter according to the present invention.

The transmitter illustrated in FIG. 28 comprises only blocks associated with transmission, which are extracted from the transceiver illustrated in FIG. 26.

While the present invention has been specifically described in connection with embodiments, it goes without saying that the present invention is not limited to the embodiments described above, and modifications can be made without departing from the spirit of the invention.

While signals of two channels having a phase difference of approximately 90 degrees therebetween have been described in internal signals of two channels generated by a frequency divider, output signals of two channels from a single sideband mixer, and the like, the "approximately 90 degrees" are preferably regarded as being 80 degrees or more and 100 degrees or less from a practical viewpoint.

The invention claimed is:

1. A signal generator comprising:
   internal signal generating means for generating a first internal signal with a frequency of f1, a second internal signal with a frequency of f2, and a third internal signal with a frequency of f3 which is twice as high as the frequency f2; and
   signal output means for selecting and delivering one output signal from among a first output signal with the frequency of f1, a second output signal with a frequency of f1+f2, and a third output signal with a frequency of f1+f3, by using the first, second, and third internal signals.

2. The signal generator according to claim 1, characterized in that:
   said frequencies f1, f2, f3 have a relationship of f1:f2:f3=n+0.5:1;2, where n is an integer that is not negative.

3. The signal generator according to claim 1, characterized in that:
   said frequencies f1, f2, f3 have a relationship of f1:f2:f3=n+0.5:1;2, where n is an integer from 6 to 17.

4. The signal generator according to claim 1, characterized in that:
   said frequencies f1, f2, f3 have a relationship of f1:f2:f3=n:1:2, where n is a positive integer.

5. The signal generator according to claim 1, characterized in that:
said frequencies f1, f2, f3 have a relationship of f1:f2:f3=n:1:2, where n is an integer from 6 to 18.

6. The signal generator according to claim 1, characterized in that:
said frequencies f1, f2, f3 have a relationship of f1:f2:f3=6.5:1:2.

7. The signal generator according to claim 1, characterized in that:
said frequencies f1, f2, f3 have a relationship of f1:f2:f3=8.5:1:2.

8. The signal generator according to claim 1, characterized in that:
said internal signal generating means comprises a signal generating unit for generating a signal with a frequency of f0, and divides the signal with the frequency of f0 to generate the first, second, and third internal signals.

9. The signal generator according to claim 8, characterized in that:
a frequency division ratio for generating the first and second internal signals from the signal with the frequency of f0 is set to one divided by an integer.

10. The signal generator according to claim 1, characterized in that:
each of said first, second, and third internal signals has two types of components including a phase advanced component and a phase delayed component.

11. The signal generator according to claim 1, characterized in that:
each of said first, second, and third internal signals has two types of components including a phase advanced component and a phase delayed component, and
each of said first, second, and third output signals has two types of components including a phase advanced component and a phase delayed component.

12. The signal generator according to claim 10, characterized in that a phase difference between the phase advanced component and the phase delayed component is 80 degrees or more and 100 degrees or less in each of said first, second, and third internal signals.

13. The signal generator according to claim 1, characterized in that:
said signal output means comprises:
a switch for selecting one signal among the second and third internal signals; and
a single side-band mixer for delivering one output signal among the first, second, and third output signals by using an internal signal selected by said switch, and the first internal signal.

14. The signal generator according to claim 1, characterized in that:
said signal output means comprises:
a switch for selecting one signal among a DC internal signal, the second internal signal, and the third internal signal; and
a single side-band mixer for delivering one signal among the first, second, and third output signals using an internal signal selected by said switch and the first internal signal.

15. The signal generator according to claim 1, characterized by comprising:
a switch for conveying the first internal signal to an output signal path.

16. A receiver characterized in that the signal generator according to claim 1 is used as a local signal generating unit.

17. A transmitter characterized in that the signal generator according to claim 1 is used as a local signal generating unit.

18. The receiver according to claim 16, characterized by comprising:
a filter disposed on a path from an antenna to a mixer for down-converting a received signal.

19. The transmitter according to claim 17, characterized by comprising:
a filter disposed on a path from a mixer for up-converting a transmit signal to an antenna.

20. The transmitter according to claim 19, characterized in that:
said filter has a cutoff characteristic for attenuating undesired transmission power due to a local signal by 10 dB or more.

21. A signal generator comprising:
internal signal generating means for generating a first internal signal with a frequency of f1, a second internal signal with a frequency of f2, and a third internal signal with a frequency of f3 which is twice as high as the frequency f2; and
signal output means for selecting and delivering one output signal from among a first output signal with the frequency of f1, a second output signal with a frequency of f1−f2, and a third output signal with a frequency of f1−f3, by using the first, second, and third internal signals.

22. The signal generator according to claim 21, characterized in that:
said frequencies f1, f2, f3 have a relationship of f1:f2:f3=n+0.5:1;2, where n is an integer that is not negative.

23. The signal generator according to claim 21, characterized in that:
said frequencies f1, f2, f3 have a relationship of f1:f2:f3=n+0.5:1;2, where n is an integer from 8 to 19.

24. The signal generator according to claim 21, characterized in that:
said frequencies f1, f2, f3 have a relationship of f1:f2:f3=n:1:2, where n is a positive integer.

25. The signal generator according to claim 21, characterized in that:
said frequencies f1, f2, f3 have a relationship of f1:f2:f3=n:1:2, where n is an integer from 8 to 20.

26. The signal generator according to claim 21, characterized in that:
said internal signal generating means comprises a signal generating unit for generating a signal with a frequency of f0, and divides the signal with the frequency of f0 to generate the first, second, and third internal signals.

27. The signal generator according to claim 26, characterized in that:
a frequency division ratio for generating the first and second internal signals from the signal with the frequency of f0 is set to one divided by an integer.

28. The signal generator according to claim 21, characterized in that:
each of said first, second, and third internal signals has two types of components including a phase advanced component and a phase delayed component.

29. The signal generator according to claim 21, characterized in that:
each of said first, second, and third internal signals has two types of components including a phase advanced component and a phase delayed component, and
each of said first, second, and third output signals has two types of components including a phase advanced component and a phase delayed component.

30. The signal generator according to claim 28, characterized in that a phase difference between the phase advanced component and the phase delayed component is 80 degrees or more and 100 degrees or less in each of said first, second, and third internal signals.

31. The signal generator according to claim 21, characterized in that:
said signal output means comprises:
a switch for selecting one signal among the second and third internal signals; and
a single side-band mixer for delivering one output signal among the first, second, and third output signals by using an internal signal selected by said switch, and the first internal signal.

32. The signal generator according to claim 21, characterized in that:
said signal output means comprises:
a switch for selecting one signal among a DC internal signal, the second internal signal, and the third internal signal; and
a single side-band mixer for delivering one signal among the first, second, and third output signals using an internal signal selected by said switch and the first internal signal.

33. The signal generator according to claim 21, characterized by comprising:
a switch for conveying the first internal signal to an output signal path.

34. A receiver characterized in that the signal generator according to claim 21 is used as a local signal generating unit.

35. A transmitter characterized in that the signal generator according to claim 21 is used as a local signal generating unit.

36. The receiver according to claim 34, characterized by comprising:
a filter disposed on a path from an antenna to a mixer for down-converting a received signal.

37. The transmitter according to claim 35, characterized by comprising:
a filter disposed on a path from a mixer for up-converting a transmit signal to an antenna.

38. The transmitter according to claim 37, characterized in that:
said filter has a cutoff characteristic for attenuating undesired transmission power due to a local signal by 10 dB or more.

39. A signal generator comprising:
internal signal generating means for generating at least a first to a third internal signal from among a first internal signal with a frequency of f1 to an n-th internal signal with a frequency of fn (n is a natural number); and
signal output means for delivering one signal among a first output signal with a frequency of f1, a second output signal with a frequency of f1+f2, and an n-th output signal with a frequency of f1+fn, by using the internal signals generated by said internal signal generating means,
wherein said frequency fn is an integer multiple of frequency f2 when n is equal to or more than three.

40. The signal generator according to claim 39, characterized in that:
a relationship expressed by (k−1)×fk is established among said frequency f2 through said frequency fn, where k is an arbitrary integer equal to or more than three and equal to or less than n.

41. The signal generator according to claim 39, characterized in that:
said internal signal generating means comprises a signal generating unit for generating a signal with a frequency of f0, and divides the signal with a frequency of f0 to generate the first to n-th internal signals.

42. The signal generator according to claim 39, characterized in that:
each of said first to n-th internal signals has two types of components including a phase advanced component and a phase delayed component.

43. The signal generator according to claim 39, characterized in that:
each of said first to n-th internal signals has two types of components including a phase advanced component and a phase delayed component; and
each of said first to n-th output signals has two types of components including a phase advanced component and a phase delayed component.

44. The signal generator according to claim 40, characterized in that:
each of said first to n-th internal signals has two types of components including a phase advanced component and a phase delayed component; and
each of said first to n-th output signals has two types of components including a phase advanced component and a phase delayed component.

45. The signal generator according to claim 44, characterized in that:
a phase difference between the phase advanced component and the phase delayed component is 80 degrees or more and 100 degrees or less in said first to n-th internal signals, and
a phase difference between the phase advanced component and the phase delayed component is 80 degrees or more and 100 degrees or less in each of said first to n-th output signals.

46. The signal generator according to claim 44, characterized in that:
a phase difference between the phase advanced component and the phase delayed component is 80 degrees or more and 100 degrees or less in said first to n-th internal signals, and
a phase difference between the phase advanced component and the phase delayed component is 80 degrees or more and 100 degrees or less in each of said first to n-th output signals.

47. The signal generator according to claim 39, characterized in that:
said signal output means comprises:
a switch for selecting one from among the second to n-th internal signals; and
a single side-band mixer for delivering one of the first to n-th output signals by using an internal signal selected by said switch and the first internal signal.

48. The signal generator according to claim 39, characterized in that:
said signal output means comprises:
a switch for selecting one signal among a DC internal signal, and the second internal signal to n-th internal signal; and
a single side-band mixer for delivering one signal among the first to n-th output signals using an internal signal selected by said switch and the first internal signal.

49. The signal generator according to claim 39, characterized by comprising:
a switch for conveying the first internal signal to an output signal path.

50. The signal generator according to claim 39, characterized in that:
the integer n is set to four.

51. The signal generator according to claim 39, characterized in that:
the integer n is set to five.

52. A receiver characterized in that the signal generator according to claim 39 is used as a local signal generating unit.

53. A transmitter characterized in that the signal generator according to claim 39 is used as a local signal generating unit.

54. The receiver according to claim 52, characterized by comprising:
a filter disposed on a path from an antenna to a mixer for down-converting a received signal.

55. The transmitter according to claim 53, characterized by comprising:
a filter disposed on a path from a mixer for up-converting a transmit signal to an antenna.

56. The transmitter according to claim 55, characterized in that:
said filter has a cutoff characteristic for attenuating undesired transmission power due to a local signal by 10 dB or more.

57. The receiver according to claim 54, characterized in that:
said filter has a cutoff characteristic for attenuating undesired transmission power due to a local signal by 10 dB or more.

58. A signal generator comprising:
internal signal generating means for generating at least a first to a third internal signal from among a first internal signal with a frequency of f1 to an n-th internal signal with a frequency of fn (n is a natural number); and
signal output means for delivering one signal among a first output signal with a frequency of f1, a second output signal with a frequency of f1-f2, and an n-th output signal with a frequency of f1-fn, by using the internal signals generated by said internal signal generating means,
wherein said frequency fn is an integer multiple of frequency f2 when n is equal to or more than three.

59. The signal generator according to claim 58, characterized in that:
a relationship expressed by $(k-1) \times fk$ is established among said frequency f2 through said frequency fn, where k is an arbitrary integer equal to or more than three and equal to or less than n.

60. The signal generator according to claim 58, characterized in that:
said internal signal generating means comprises a signal generating unit for generating a signal including frequency f0, and divides the signal including frequency f0 to generate the first to n-th internal signals.

61. The signal generator according to claim 58, characterized in that:
each of said first to n-th internal signals has two types of components including a phase advanced component and a phase delayed component.

62. The signal generator according to claim 58, characterized in that:
said signal output means comprises:
a switch for selecting one from among the second to n-th internal signals; and
a single side-band mixer for delivering one of the first to n-th output signals by using an internal signal selected by said switch and the first internal signal.

63. The signal generator according to claim 58, characterized in that:
said signal output means comprises:
a switch for selecting one signal among a DC internal signal, and the second internal signal to n-th internal signal; and
a single side-band mixer for delivering one signal among the first to n-th output signals using an internal signal selected by said switch and the first internal signal.

64. The signal generator according to claim 58, characterized by comprising:
a switch for conveying the first internal signal to an output signal path.

65. The signal generator according to claim 58, characterized in that:
the integer n is set to four.

66. The signal generator according to claim 58, characterized in that:
the integer n is set to five.

67. A receiver characterized in that the signal generator according to claim 58 is used as a local signal generating unit.

68. A transmitter characterized in that the signal generator according to claim 58 is used as a local signal generating unit.

69. The receiver according to claim 67, characterized by comprising:
a filter disposed on a path from an antenna to a mixer for down-converting a received signal.

70. The transmitter according to claim 68, characterized by comprising:
a filter disposed on a path from a mixer for up-converting a transmit signal to an antenna.

71. The transmitter according to claim 70, characterized in that:
said filter has a cutoff characteristic for attenuating undesired transmission power due to a local signal by 10 dB or more.

72. The receiver according to claim 69, characterized in that:
said filter has a cutoff characteristic for attenuating undesired transmission power due to a local signal by 10 dB or more.

* * * * *

UNITED STATES PATENT AND TRADEMARK OFFICE
CERTIFICATE OF CORRECTION

| | | |
|---|---|---|
| PATENT NO. | : 7,652,542 B2 | Page 1 of 1 |
| APPLICATION NO. | : 11/569049 | |
| DATED | : January 26, 2010 | |
| INVENTOR(S) | : Noriaki Matsuno | |

It is certified that error appears in the above-identified patent and that said Letters Patent is hereby corrected as shown below:

Column 9, line 22, delete "after $^1/(2n'1)$ and insert --after $^1/(2n+1)$--.

Column 17, line 8 delete "f1, f2, t3" and insert --f1, f2, f3--.

Signed and Sealed this

Eleventh Day of October, 2011

David J. Kappos
*Director of the United States Patent and Trademark Office*